(12) United States Patent
Anthony et al.

(10) Patent No.: US 12,703,144 B2
(45) Date of Patent: Aug. 11, 2026

(54) SHEAR THINNING BUILD MATERIAL SLURRY

(71) Applicant: PERIDOT PRINT LLC, Palo Alto, CA (US)

(72) Inventors: Thomas Craig Anthony, Palo Alto, CA (US); Ben Mint Pon, Palo Alto, CA (US); Hardik Rajesh Hingorani, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 235 days.

(21) Appl. No.: 18/008,370

(22) PCT Filed: Jun. 25, 2020

(86) PCT No.: PCT/US2020/039566
§ 371 (c)(1),
(2) Date: Dec. 5, 2022

(87) PCT Pub. No.: WO2021/262172
PCT Pub. Date: Dec. 30, 2021

(65) Prior Publication Data

US 2023/0278283 A1 Sep. 7, 2023

(51) Int. Cl.
*B29C 64/165* (2017.01)
*B28B 1/00* (2006.01)
(Continued)

(52) U.S. Cl.
CPC ............ *B29C 64/165* (2017.08); *B28B 1/001* (2013.01); *B33Y 10/00* (2014.12); *B33Y 70/10* (2020.01); *C04B 2235/6026* (2013.01)

(58) Field of Classification Search
CPC ....... B29C 64/165; B28B 1/001; B33Y 10/00; B33Y 70/10; C04B 2235/6026
(Continued)

(56) References Cited

U.S. PATENT DOCUMENTS 9,783,718 B2 10/2017 Stevenson et al.
2005/0059757 A1 3/2005 Bredt et al.
(Continued)

FOREIGN PATENT DOCUMENTS

CN 106045503 A 10/2016
EP 1627393 A1 2/2006
(Continued)

OTHER PUBLICATIONS

S Kondo, F Fujiwara, M Muroya, The effect of heat-treatment of silica gel at high temperature, Journal of Colloid and Interface Science, vol. 55, Issue 2, (Year: 1976).*
(Continued)

*Primary Examiner* — JaMel M Nelson
*Assistant Examiner* — Erica Hartsell Funk
(74) *Attorney, Agent, or Firm* — Dierker & Kavanaugh, P.C.

(57) ABSTRACT

A shear thinning build material slurry includes metallic or ceramic particles having a particle size up to about 20 ?m; a hydrocolloid present in an amount ranging from about 0.05 percent by volume to less than 0.5 percent by volume of the shear thinning build material slurry; and water. The build material slurry is a ready-to-use three-dimensional (3D) printing build material.

19 Claims, 7 Drawing Sheets

(51) Int. Cl.

*B33Y 10/00* (2015.01)
*B33Y 70/10* (2020.01)

(58) Field of Classification Search

USPC .......................................................... 264/497
See application file for complete search history.

(56) References Cited

U.S. PATENT DOCUMENTS

| | | | | |
|---|---|---|---|---|
| 2008/0187711 | A1* | 8/2008 | Alam | B29C 64/165 106/35 |
| 2014/0035995 | A1* | 2/2014 | Chou | C09D 11/322 252/514 |
| 2017/0189960 | A1 | 7/2017 | Hiroyuki | |
| 2017/0283629 | A1* | 10/2017 | Fortier | C09D 11/322 |
| 2017/0320128 | A1 | 11/2017 | Deters et al. | |
| 2018/0111881 | A1 | 4/2018 | Schubert et al. | |
| 2018/0298159 | A1 | 10/2018 | Okashimo et al. | |
| 2019/0016043 | A1* | 1/2019 | Olubummo | B33Y 70/10 |
| 2019/0337235 | A1 | 11/2019 | Moosberg et al. | |
| 2020/0047252 | A1* | 2/2020 | Kritchman | B33Y 50/02 |
| 2020/0172444 | A1* | 6/2020 | Bonderer | A61C 13/0019 |
| 2022/0048013 | A1 | 2/2022 | Mullens et al. | |

FOREIGN PATENT DOCUMENTS

| | | | |
|---|---|---|---|
| JP | 6633677 | B2 | 1/2020 |
| KR | 10-2018-0088640 | A | 8/2018 |
| RU | 2689833 | C1 | 5/2019 |
| RU | 2706616 | C2 | 11/2019 |
| WO | 2004/064080 | A1 | 7/2004 |
| WO | 2009/027525 | A2 | 3/2009 |
| WO | 2012/164078 | A2 | 12/2012 |
| WO | 2017/059866 | A2 | 4/2017 |
| WO | 2019/083515 | A1 | 5/2019 |
| WO | 2019/213602 | A1 | 11/2019 |

OTHER PUBLICATIONS

EDinformatics, https://www.edinformatics.com/math_science/hydrocolloids.htm (Year: 1999).*

Avery et al., "The Rheology of Dense Colloidal Pastes Used in 3D-Printing", NIP & Digital Fabrication Conference (NIP 30), Sep. 2014, 6 pages.

Yang et al., "3D printing of alumina ceramic parts by heat-induced solidification with carrageenan", Materials Letters, vol. 255, Aug. 21, 2019, pp. 1-3.

* cited by examiner

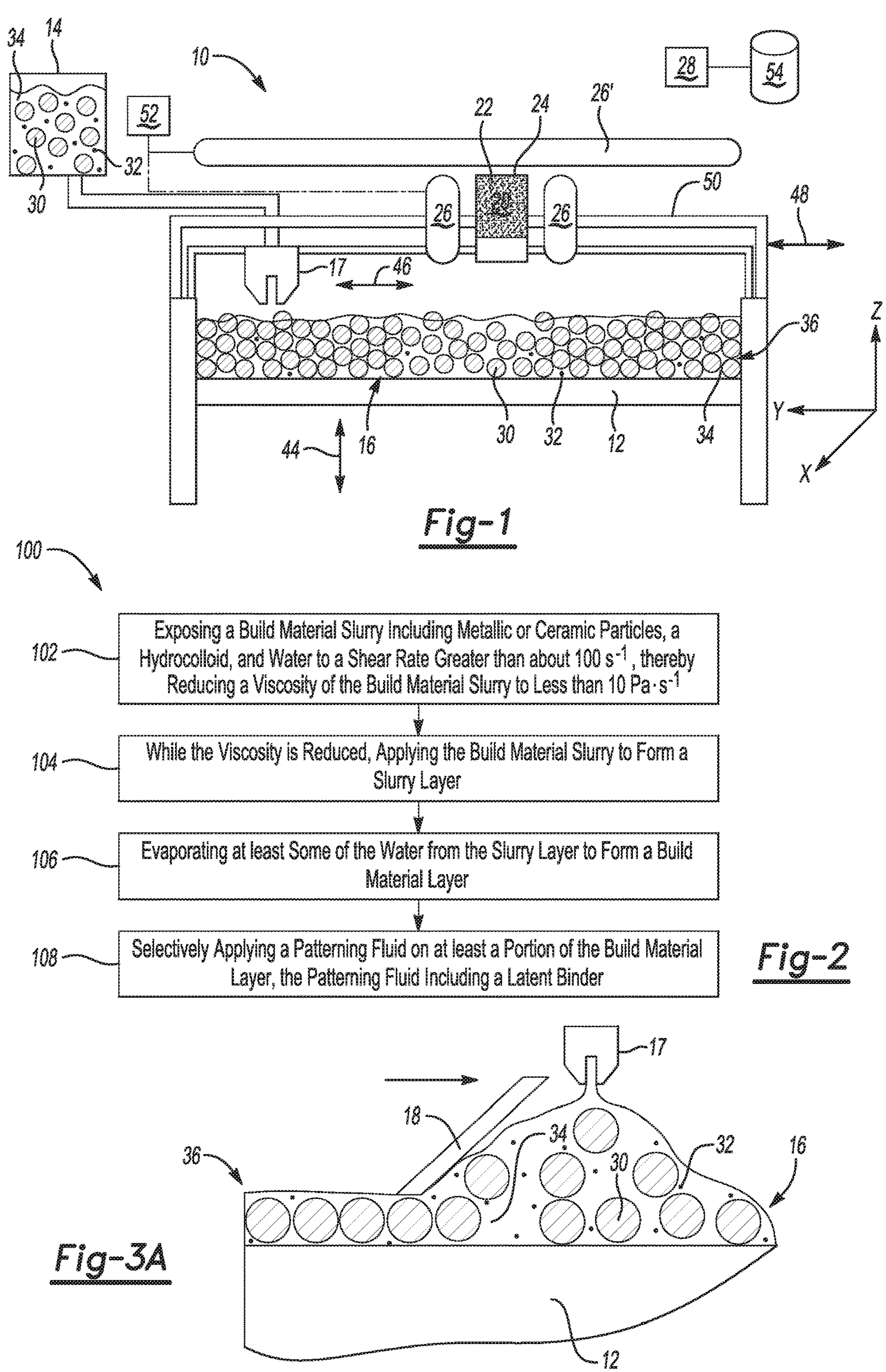

10
14
34
30
32
52
22
24
26'
28
54
26
26
50
48
17
46
36
Z
Y
X
16
30
32
12
34
44
Fig-1
100
102
Exposing a Build Material Slurry Including Metallic or Ceramic Particles, a Hydrocolloid, and Water to a Shear Rate Greater than about 100 s-1 , thereby Reducing a Viscosity of the Build Material Slurry to Less than 10 Pa·s-1
104
While the Viscosity is Reduced, Applying the Build Material Slurry to Form a Slurry Layer
106
Evaporating at least Some of the Water from the Slurry Layer to Form a Build Material Layer
108
Selectively Applying a Patterning Fluid on at least a Portion of the Build Material Layer, the Patterning Fluid Including a Latent Binder
Fig-2
17
18
34
32
16
36
30
12
Fig-3A 38
30
32'
34
32

12
48
24
20
42
30
22
22
42
32'

40
12
48
26
42
22'
22'
42
32'

30
12

26'
58
64
30
38
42
56,56'
42
12

66
30
56'

26'
64
62
60

SHEAR THINNING BUILD MATERIAL SLURRY

BACKGROUND

Three-dimensional (3D) printing techniques are used to make three-dimensional solid parts from a digital model. 3D printing is often used in rapid product prototyping, mold generation, mold master generation, and short run manufacturing. Some 3D printing techniques are additive printing processes, and others are powder bed processes. Some 3D print processes use metal materials, such as metal binder jetting, selective laser melting (SLM), electron beam melting (EBM), or laser metal deposition (LMD).

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic and partially cross-sectional view of an example of a 3D printing system disclosed herein;

FIG. 2 is a flow diagram illustrating an example of a method for 3D printing disclosed herein;

FIGS. 3A through 3G are schematic and partially cross-sectional views depicting the formation of a 3D part using an example of a method for 3D printing disclosed herein;

DETAILED DESCRIPTION

Figures 3B, 3C, 3D:
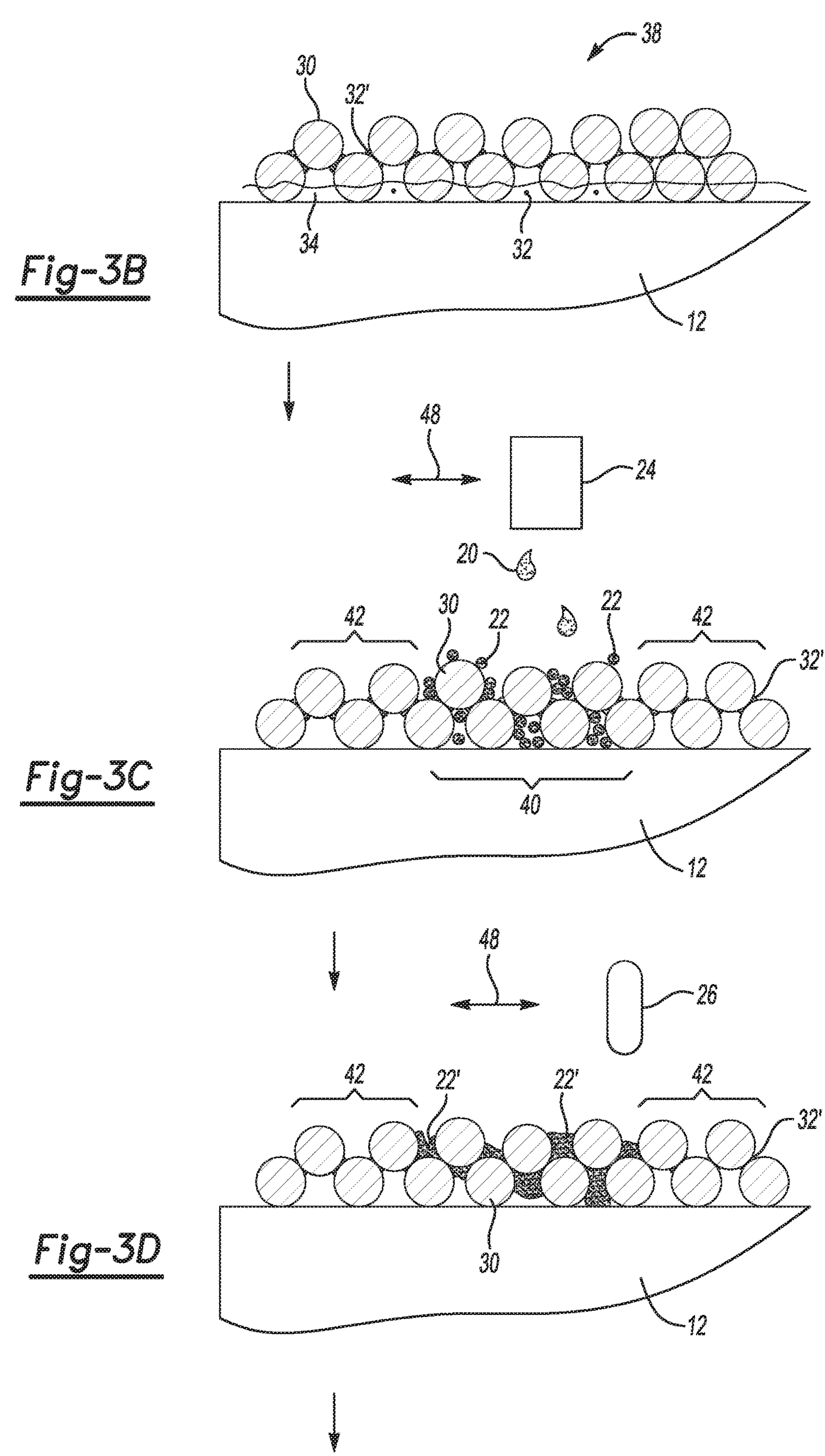

A build material slurry for three-dimensional printing is disclosed herein. The build material slurry includes metallic or ceramic particles, a hydrocolloid, and water. The hydrocolloid is incorporated in a very small amount (e.g., less than 0.5 percent by volume), which has been found to impart a shear thinning effect. With regard to shear thinning, the viscosity of the build material slurry reduces by a factor of at least 30 when the shear rate is increased from about 0.1 $s^{-1}$ to about 100 $s^{-1}$ or greater.

At the higher shear rates (e.g., 100 $s^{-1}$ or greater), the viscosity of the build material slurry is reduced such that it can be easily dispensed from an automated slurry delivery device, such as, e.g., a doctor blade coater, a slot die coater, a rod coater, a knife coater, or combinations thereof, and can also be readily spread into a thin and substantially uniform layer.

At the low shear rates (e.g., about 0.1 $s^{-1}$ or lower), the elevated viscosity of the build material slurry limits the mobility of the metallic or ceramic particles and they are suspended throughout the slurry. The suspended particles are resistant to gravitational settling, e.g., for days, as opposed to hours. Compared to settled particles, suspended particles can reduce clogging in one or more printer components, such as tubing, reservoirs, dispensing orifices, etc.

The build material slurry disclosed herein responds rapidly to changes in shear rate. As such, the build material slurry can transition from a gel-like material to a liquid material or from a liquid material to a gel-like material within seconds (e.g., 5 seconds or less) of being exposed to a change in the shear rate. The ability of the build material slurry to rapidly thicken can reduce capillary flow of water (and other liquid components in the slurry) into underlying, and drier, build material layers during the slurry application and patterning process. This can reduce the percentage of trapped air, and improve the packing density of the build material particles. This, in turn, can lead to less shrinkage of the 3D object during sintering and tighter dimensional accuracy of the 3D object after sintering. The ability of the build material slurry to rapidly thicken also reduces leakage of the build material slurry from the dispenser.

Definitions

It is to be understood that terms used herein will take on their ordinary meaning in the relevant art unless specified otherwise. Several terms used herein and their meanings are set forth below.

The singular forms “a”, “an”, and “the” include plural referents unless the context clearly dictates otherwise.

The terms comprising, including, containing and various forms of these terms are synonymous with each other and are meant to be equally broad.

As used herein, the terms “latent binder” and “latent binder particles” refer to a binding material that is inactive (non-binding) in a liquid vehicle, but becomes active (binding) upon exposure to heat or electromagnetic radiation. In some examples, the latent binder is a polymer. In some examples, the latent binder is inorganic. In some examples, the latent binder may be partially or fully water soluble when inactive, and may become water insoluble once activated. In still other examples, the latent binder is a non-particulate, or solution, binder. In yet another example, the latent binder is a dispersion of water insoluble particles that may become no longer dispersible in water following binder activation. The activated form of the latent binder may be referred to herein as the “activated binder.”

As used herein, the term “patterned intermediate part” (also known as a patterned green part) refers to a part/object precursor that has a shape representative of the final 3D printed part and that includes metallic or ceramic particles patterned with the patterning fluid. In the patterned intermediate part, the metallic or ceramic particles may or may not be weakly bound together by the hydrocolloid of the slurry, by one or more components of the patterning fluid, and/or by attractive force(s) between the metallic or ceramic particles and the patterning fluid. In some instances, the mechanical strength of the patterned intermediate part is such that it cannot be handled or extracted from a build material platform. Moreover, it is to be understood that any metallic or ceramic particle that is not patterned with the patterning fluid is not considered to be part of the patterned intermediate part, even if it is adjacent to or surrounds the patterned intermediate part.

As used herein, the term "cured intermediate part" (also known as a cured green part) refers to a patterned intermediate part in which the latent binder of the patterning fluid has been activated so that it forms a glue that coats at least a portion of the metallic or ceramic particles and creates or strengthens the bond between the metallic or ceramic particles. In other words, the "cured intermediate part" is a part precursor with a shape representative of the final 3D printed part and that includes metallic or ceramic particles bound together by activated binder particles. Compared to the patterned intermediate part, the mechanical strength of the cured intermediate part is greater, and in some instances, the cured intermediate part can be handled or extracted from the build material platform.

It is to be understood that the term "green" when referring to the patterned green part or the cured green part does not connote color, but rather indicates that the part is not yet fully processed.

As used herein, the term "at least substantially binder-free part" (also known as an at least substantially binder-free gray part") refers to a cured intermediate part that has been exposed to a heating process that initiates thermal decomposition of some examples of the activated binder so that the activated binder is at least partially removed. In some instances, volatile organic components of, or produced by, the thermally decomposed activated binder are completely removed. In other cases, a very small amount of nonvolatile residue from the thermally decomposed binder particles may remain (e.g., <5 wt % of the initial latent binder may remain). In still other instances, the thermally decomposed binder particles (including any products and residues) are completely removed. In other words, the "at least substantially binder-free part" refers to a part precursor with a shape representative of the final 3D printed part and that includes metallic or ceramic particles bound together as a result of i) weak sintering (i.e., low level necking between the particles, which is able to preserve the part shape), or ii) a small amount of the activated binder particles remaining, or iii) oxygen mediated bonding between metal particles, or iv) Van der Waals forces, and/or v) any combination of i, ii, iii, and/or iv.

It is to be understood that the term "gray" when referring to the at least substantially binder-free gray part does not connote color, but rather indicates that the part is not yet fully processed.

The at least substantially binder-free part may have porosity similar to or greater than the cured intermediate part (due to at least substantial removal of the activated binder), but the porosity is at least substantially eliminated during the transition to the 3D printed part.

The discussion of the substantially binder-free part generally relates to organic binders that at least partially thermally decompose during the method. Inorganic binders, for example, metal nanoparticles or metal salts, are another class of binders that may be used. When inorganic activated binders are used, a large percentage of the activated binder may remain after thermal treatment (e.g., from about 10 wt % up to nearly 100 wt %). As such, in at least some of these instances, the "at least substantially binder-free part" is not generated during the method.

As used herein, the term "sintered part" refers to the final 3D printed part or object, which has been exposed to a heating process that sinters the metallic or ceramic particles. In the sintered part, the metallic or ceramic particles may merge together to form a continuous body. By "continuous body," it is meant that the metallic or ceramic particles are merged together to form a single part with sufficient mechanical strength to meet the requirements of the desired final 3D part.

The term "particle size," as used herein, refers to a volume-weighted mean diameter or a mass-weighted mean diameter of a particle distribution. "D50" means that 50% of the particles in the distribution are less than the given size, and "D90" means that 90% of the particles in the distribution are less than the given size.

As used herein, the terms "volume percent" or "vol. %" or "percent by volume" refer to the percentage, by volume, of a particular component in a slurry, fluid, etc. Components are often measured in terms of mass, and for the examples disclosed herein, the true density of the component may be used to convert the mass or weight percent to volume percent.

As used herein, the term "true density" refers to the density of individual particles that make up a powder or particulate solid. This is in contrast to bulk density, which measures the average density of a volume of powder in air. The true density of the some of the slurry components are set forth in Tables 1 and 2 below.

Shear Thinning Build Material Slurry

The shear thinning build material slurry includes metallic or ceramic particles having an individual particle size up to about 20 μm; a hydrocolloid present in an amount ranging from about 0.05 percent by volume to less than 0.5 percent by volume of the shear thinning build material slurry; and water; wherein the build material slurry is a ready-to-use three-dimensional (3D) printing build material.

In some examples, the build material slurry may include additional components. An example of an additional component that may be included in the build material slurry includes a humectant, an evaporation enhancer, a surfactant, an antimicrobial agent, or combinations thereof.

In other examples, the build material slurry consists of the metallic or ceramic particles, the hydrocolloid, and water. In still other examples, the build material slurry consists of the metallic or ceramic particles, the hydrocolloid, the humectant, and water. In yet further examples, the build material slurry consists of the metallic or ceramic particles, the hydrocolloid, the humectant, the evaporation enhancer, the surfactant, the antimicrobial agent, and water. In any of these examples, the build material slurry includes no other components.

In any of the examples disclosed herein, the build material slurry is a ready-to-use three-dimensional (3D) printing build material. As used herein "a ready-to-use 3D build material," refers to a composition that can be or is to be used in 3D printing as a build material without any further processing. In other words, a ready-to-use 3D build material (examples of the slurry disclosed herein) may be applied to a build area platform or a previously formed and patterned build material layer without undergoing any processing first.

As mentioned above, some examples of the build material slurry include the metallic particles. The metallic particles may be any particulate metallic material. The particulate metallic material may be in powder form prior to being incorporated into the build material slurry. As an example, metal injection molding (MIM) powders may be used as the metallic particles.

In an example, the metallic particles may be a single phase metallic material composed of one element. In another example, the metallic particles are composed of two or more elements, which may be in the form of a single phase metallic alloy or a multiple phase metallic alloy.

As mentioned, the metallic particles may be composed of a single elements or alloys. Some examples of the metallic particles include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been provided, it is to be understood that other alloys may be used.

The true densities of some of the metallic particles are provided in Table 1.

TABLE 1

| Metallic Particle | True Density ($g/cm^3$) |
| --- | --- |
| Al | 2.71 |
| Cu | 8.94 |
| Fe | 7.85 |
| Ni | 8.91 |
| Co | 8.75 |
| Ag | 10.49 |
| Au | 19.32 |
| austenitic nickel-chromium-based superalloys | 8.50 |
| stainless steel | 8.00 |
| Brass | 8.47 |
| Bronze | 8.80 |

Other examples of the build material slurry include the ceramic particles. The ceramic particles may be any particulate ceramic material. Examples of suitable ceramic materials include metal oxides, inorganic glasses, carbides, nitrides, and borides. Some specific examples include alumina ($Al_2O_3$), $Na_2O/CaO/SiO_2$ glass (soda-lime glass), silicon nitride ($Si_3N_4$), silicon dioxide ($SiO_2$), zirconia ($ZrO_2$), titanium dioxide ($TiO_2$), or combinations thereof. As an example of one suitable combination, 30 wt % glass may be mixed with 70 wt % alumina.

The metallic or ceramic particles may have a distribution of particle sizes. Moreover, particles with two or more particle size distributions may be combined together. In an example, the particle size of the metallic or ceramic particles is up to 20 μm. In this example, this particle size represents the D50 particle size. The breadth of the particle size distribution (PSD) is indicated by D10 and D90 particle sizes. D10 may vary between 10% to 80% of D50, and D90 may vary between 120% to 300% of D50. In an example, D50 is 8 μm, D10 is 5 μm, and D90 is 13 μm. In an example, the metallic or ceramic particles may be nanoparticles, having a D50 particle size ranging from about 50 nm to less than 1000 nm (1 μm). In another example, the D50 particle size of the metallic or ceramic particles ranges from about 1 μm to about 20 μm. In still another example, the D50 particle size of the metallic or ceramic particles ranges from greater than 3 μm to about 20 μm. In yet another example, the D50 particle size of the metallic or ceramic particles ranges from about 5 μm to about 15 μm. In yet another example, the D50 particle size of the metallic or ceramic particles ranges from about 1 μm to about 5 μm. In yet another example, the D50 particle size of the metallic or ceramic particles is about 10 μm. In terms of D90, the particle size of the metallic or ceramic particles may be up to 50 μm. In an example of two particle size distributions combined together, the D50 of one of the distributions is about 2 μm and the D50 of another of the distributions is about 10 μm.

The metallic or ceramic particles may also be non-spherical, spherical, random shapes, or combinations thereof.

In an example, the metallic or ceramic particles are present in an amount ranging from about 35 percent by volume to about 70 percent by volume, based on the total volume of the build material slurry. In other examples, the amount of the metallic or ceramic particles present in the build material slurry ranges from about 40 volume percent to about 65 volume percent, or from about 50 volume percent to about 60 volume percent, based on the total volume of the build material slurry.

Metallic or ceramic particles are often measured in terms of mass. The weight percent of metallic or ceramic particles in the slurry is a function of the true density of the build material. For example, a slurry of stainless steel particles (true density=8.0 g/cc, i.e., 8.0 $g/cm^3$) may have build material particles making up from about 88 wt % to about 92 wt %, whereas an equivalent slurry of aluminum particles (true density=2.7 g/cc) may contain about 75 wt % of build material particles or an equivalent slurry of gold particles (true density=19.3 g/cc) may contain about 96 wt % of metal build material particles. The volume percent can be calculated from a desired weight percent and the true density of the metallic or ceramic particle. For the previous examples, the stainless steel particles make up from about 50 vol % to about 60 vol % of the slurry, whereas the aluminum and gold particles make up about 50 vol % of slurry.

The build material slurry also includes the hydrocolloid. The hydrocolloid is a viscosity modifier which at least contributes to the shear thinning property of the build material slurry. The hydrocolloid is a high molecular weight polymer (e.g., ranging from about $0.5\times10^6$ g/mol to about $50\times10^6$ g/mol) that can undergo physical crosslinking when little or no shear is applied (e.g., a shear rate of 0.1 $s^{-1}$ or less). The physical crosslinks create an entangled polymer network, e.g., through Van der Waals forces, hydrogen bonding, etc. The metallic or ceramic particles of the build material slurry may be held within this entangled polymer network, which helps decrease particle settling. However, when exposed to high shear (e.g., a shear rate of 100 $s^{-1}$ or greater) the physical crosslinks are broken, and the viscosity of the build material slurry significantly decreases.

Some examples of the hydrocolloid also have a decomposition temperature of greater than 100° C. While it may be desirable for the hydrocolloid to provide some binding between the metallic or ceramic particles during patterning and formation of the intermediate part, it may not be desirable for the hydrocolloid to remain in the final, sintered 3D part. With a minimum decomposition temperature of 100° C., the hydrocolloid will undergo minimal, if any, chemical change below 100° C., and will remain in the intermediate part; but will decompose at sintering temperatures.

Still further, the hydrocolloid may be selected so that a solid thermal decomposition product of the hydrocolloid in the sintered part is less than 30% of an initial weight of the hydrocolloid in the build material slurry. This will help to ensure that significant levels of contaminants (e.g., carbon) are not left behind after sintering to a level that affects material properties. Some hydrocolloids result in about 20 wt % of decomposition product. Other hydrocolloids decompose even more cleanly, leaving about 10 wt % of decomposition product. In this last example, a slurry with 0.15 wt % of the hydrocolloid (about 0.5 vol %) would result in 0.015 wt % of the decomposition product in the final 3D part.

In some examples, the hydrocolloid has a decomposition temperature of greater than 100° C. and its solid thermal decomposition product is less than 30% of the initial weight of the hydrocolloid.

In an example, the hydrocolloid is selected from the group consisting of xanthan gum, scleroglucan, carboxymethyl cellulose, guar gum, locust bean gum, tara gum, cassia gum, gum tragacanth, agar, welan gum, diutan gum, rhamsan gum, carrageenan, flaxseed gum, tamarind gum, konjac maanan, agarose, gellan gum, and combinations thereof. Guar gum, locust bean gum, tara gum, and cassia gum can increase the viscosity when used in combination with xanthan gum, and thus may be particularly desirable for use in combination with xanthan gum. In another example, the hydrocolloid is selected from the group consisting of xanthan gum, scleroglucan, welan gum, diutan gum, and combinations thereof.

The true densities of some of the hydrocolloids and an alternative viscosity modifier (polyethylene glycol) are provided in Table 2.

TABLE 2

| Hydrocolloid | True Density ($g/cm^3$) |
|---|---|
| xanthan gum | 1.60 |
| carrageenan | 1.37 |
| gum arabic | 1.40 |
| pectin | 1.50 |
| agarose | 1.64 |
| scleroglucan | 1.43 |
| **Alternative Viscosity Modifier** | **True Density ($g/cm^3$)** |
| polyethylene glycol | 1.13 |

It is desirable to include a low amount of the hydrocolloid in the build material slurry so that minimal, if any, remnants of the hydrocolloid are present in the final 3D part. Moreover, too much of the hydrocolloid can increase the water solubility of the cured intermediate part, which can render the cured intermediate part susceptible to mechanical damage during wet de-caking processes (described in further detail below). It has been found that less than 0.5 vol % of the hydrocolloid significantly increases the viscosity of the build material slurry at low shear, enables desirable flow (reduction in viscosity) at high shear, limits mechanical degradation of the cured intermediate part during wet decake, and is readily removable during sintering. In the examples disclosed herein, the hydrocolloid is present in an amount ranging from about 0.05 percent by volume to less than 0.5 percent by volume, based on the total volume of the build material slurry. In some examples, the hydrocolloid is present in an amount ranging from about 0.07 percent by volume to less than 0.47 percent by volume, based on the total volume of the build material slurry.

When preparing the slurry, it may be desirable to first incorporate the hydrocolloid into the vehicle (i.e., water, alone or in combination with any of the additives disclosed herein). As such, the initial concentration of the hydrocolloid may be in terms of its weight percentage in the slurry vehicle (which is independent of the metal density). In some examples, the weight percent of the hydrocolloid in the vehicle ranges from about 1 wt % to about 1.8 wt %. High shear mixing and/or elevated temperature may be used to facilitate uniform distribution of hydrocolloid in the slurry vehicle. The slurry vehicle, having the hydrocolloid therein, may be exposed to vacuum de-gassing to remove air bubbles. The slurry vehicle, having the hydrocolloid therein, and the metallic or ceramic particles are then combined to achieve the desirable volume percentages. The build material slurry may also be exposed to high shear mixing to uniformly distribute and mix the metal particles and the slurry vehicle. Vacuum de-gassing may be conducted on the slurry to remove air bubbles, which can manifest as porosity in deposited slurry coatings.

Table 3 provides some example slurry formulations with a loading of 0.45 vol %. The table includes the type of metal build material particles (including its true density), a hydrocolloid with a true density of 1.5 $g/cm^3$, and water. The volume percentages and the corresponding weight percentages are listed for each component.

TABLE 3

| Stainless Steel Slurries | | | | | |
|---|---|---|---|---|---|
| Slurry Components | Material (True Density) | Slurry #1 | Slurry #2 | Slurry #3 | Slurry #4 |
| Build material | Stainless steel | 45 vol % | 50 vol % | 55 vol % | 60 vol % |
| Particles | (8.00 g/cc) | 86.70 wt % | 88.84 wt % | 90.68 wt % | 92.27 wt % |
| Hydrocolloid | Any with | 0.45 vol % | 0.45 vol % | 0.45 vol % | 0.45 vol % |
| | 1.5 g/cc | 0.16 wt % | 0.15 wt % | 0.14 wt % | 0.13 wt % |
| Water | Deionized | 54.55 vol % | 49.55 vol % | 44.55 vol % | 39.55 vol % |
| | (1.0 g/cc) | 13.14 wt % | 11.01 wt % | 9.18 wt % | 7.60 wt % |
| **Copper Slurries** | | | | | |
| Slurry Components | Material (True Density) | Slurry #5 | Slurry #6 | Slurry #7 | Slurry #8 |
| Build material | Copper | 45 vol % | 50 vol % | 55 vol % | 60 vol % |
| Particles | (8.90 g/cc) | 87.88 wt % | 89.86 wt % | 91.54 wt % | 80.17 wt % |
| Hydrocolloid | Any with | 0.45 vol % | 0.45 vol % | 0.45 vol % | 0.45 vol % |
| | 1.5 g/cc | 0.15 wt % | 0.14 wt % | 0.13 wt % | 0.33 wt % |
| Water | Deionized | 54.55 vol % | 49.55 vol % | 44.55 vol % | 39.55 vol % |
| | (1.0 g/cc) | 11.97 wt % | 10.01 wt % | 8.33 wt % | 19.50 wt % |

TABLE 3-continued

| Slurry Components | Material (True Density) | Slurry #9 | Slurry #10 | Slurry #11 | Slurry #12 |
|---|---|---|---|---|---|
| Gold Slurries | | | | | |
| Build material Particles | Gold (19.32 g/cc) | 45 vol % 94.03 wt % | 50 vol % 95.06 wt % | 55 vol % 95.92 wt % | 60 vol % 96.65 wt % |
| Hydrocolloid | Any with 1.5 g/cc | 0.45 vol % 0.07 wt % | 0.45 vol % 0.07 wt % | 0.45 vol % 0.06 wt % | 0.45 vol % 0.06 wt % |
| Water | Deionized (1.0 g/cc) | 54.55 vol % 5.90 wt % | 49.55 vol % 4.88 wt % | 44.55 vol % 4.02 wt % | 39.55 vol % 3.30 wt % |
| Aluminum Slurries | | | | | |
| Build material Particles | Aluminum (2.71 g/cc) | 45 vol % 68.83 wt % | 50 vol % 72.96 wt % | 55 vol % 76.72 wt % | 60 vol % 80.17 wt % |
| Hydrocolloid | Any with 1.5 g/cc | 0.45 vol % 0.38 wt % | 0.45 vol % 0.36 wt % | 0.45 vol % 0.35 wt % | 0.45 vol % 0.33 wt % |
| Water | Deionized (1.0 g/cc) | 54.55 vol % 30.79 wt % | 49.55 vol % 26.68 wt % | 44.55 vol % 22.93 wt % | 39.55 vol % 19.50 wt % |

Some examples of the build material slurry also include a humectant. The humectant may be added to help control the evaporation rate. If the water in the slurry were to evaporate too quickly, the solid components of the slurry could build up on the dispenser, which can lead to caking, clogging, etc. Examples of suitable humectants include 1,2-butanediol, 2-pyrrolidone, 2,3-pentanediol, ethylene glycol, propylene glycol, or combinations thereof.

In the examples disclosed herein, the humectant is present in an amount ranging from about 1 percent by volume to 11 percent by volume, based on the total volume of the build material slurry.

Some examples of the build material slurry also include an evaporation enhancer. The evaporation enhancer may be added to help control the evaporation rate. Examples of evaporation enhancers are liquids with a higher vapor pressure than water, such as lower molecular weight alcohols.

In the examples disclosed herein, the evaporation enhancer is present in an amount ranging from about 7.5 percent by volume to 30 percent by volume, based on the total volume of the build material slurry.

In some examples, a surfactant may be included in the build material slurry to control the viscosity, to improve the lubricity, and to prevent agglomeration of the metallic or ceramic particles. Examples of suitable surfactants that may be included in the slurry include a structured acrylate copolymer with pigment-affinic groups (DISPERBYK-2015 from BYK), a low molecular weight acrylic acid polymer (CARBOSPERSE® K7028, available from Lubrizol), a self-emulsifiable, nonionic wetting agent based on acetylenic diol chemistry (e.g., SURFYNOL® SEF from Evonik), a nonionic fluorosurfactant (e.g., CAPSTONE® fluorosurfactants from DuPont, previously known as ZONYL® FSO), and combinations thereof. In other examples, the surfactant is an ethoxylated low-foam wetting agent (e.g., SURFYNOL® 440 or SURFYNOL® CT-111 or CARBOWET® GA-211, each of which is from Evonik). Still other suitable surfactants include water-soluble, nonionic surfactants (e.g., TERGITOL™ TMN-6 or TERGITOL™ 15-S-9 (a secondary alcohol ethoxylate) from The Dow Chemical Company). One further example includes anionic surfactants such as DOWFAX® 2A1 from The Dow Chemical Company.

When a single surfactant is used or a combination of surfactants is used, the total amount of surfactant(s) in the build material slurry may range from about 0.01 percent by volume to 2.0 percent by volume, based on the total volume of the build material slurry.

An antimicrobial agent may be included in the build material slurry. Suitable antimicrobial agents include biocides and fungicides. Example antimicrobial agents may include the NUOSEPT™ (Troy Corp.), UCARCIDE™ (Dow Chemical Co.), ACTICIDE® B20 (Thor), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.).

The antimicrobial agent may be added in any amount ranging from about 0.01 percent by volume to about 0.05 percent by volume, based on the total volume of the build material slurry.

In the examples described herein, the balance of the build material slurry is water (true density 1.00 g/cm$^3$). As an example, deionized water or purified water may be used.

The balance of water may account for from about 20 vol % to about 60 vol % of the total volume of the build material slurry. In some cases it is desirable to minimize the amount of water in the slurry to accelerate water removal from the slurry, reduce water penetration into underlying slurry layers, and limit slurry extrusion from the dispensing device when not coating (i.e., in low shear rate state).

As mentioned, the slurry has a different viscosity depending upon the shear rate to which the slurry is exposed. At low shear rates, such as 0.1 s$^{-1}$ or lower, the viscosity may be 100 Pa·s or higher. At high shear rates, such as 100 s$^{-1}$ or higher, the viscosity may be 10 Pa·s or lower. In some examples, a ratio of the viscosity of the shear thinning build material measured at a shear rate of 0.1 s$^{-1}$ (low shear) to the viscosity of the shear thinning build material measured at a shear rate of 100 s$^{<1}$ or more (high shear) is greater than 30. In other words, when exposed to the high shear rate, the viscosity of the slurry may be reduced by a factor of 30 or greater compared to a viscosity of the slurry when exposed to the low shear rate.

Patterning Fluid

The patterning fluid includes a latent binder in a liquid vehicle. In some instances, the patterning fluid consists of the latent binder and the liquid vehicle, without any other components. The liquid vehicle may include water, alone or in combination with other additives.

The latent binder may be dissolved or dispersed throughout the liquid vehicle. It is to be understood, however, that the latent binder becomes insoluble in water after activation, e.g., during the 3D printing process or after a thermal cure. Latent binder activation may involve heating to reach the minimum film formation temperature (MFFT) of the patterning fluid or to reach a reaction temperature that leads to a chemical change in the latent binder. Alternatively, or in combination with heating, the latent binder may be exposed to ultraviolet (UV) radiation (e.g., wavelengths ranging from about 100 nm to about 400 nm) to initiate a chemical reaction in the patterning fluid. The patterning fluid may be dispensed as separate components of a reactive mixture such that a chemical reaction occurs upon dispensing the multiple components in the same location on the slurry coating.

The latent binder may be any material that, upon activation, has enough adhesive strength to hold the metallic or ceramic particles together in the cured intermediate part. In some examples, the activated binder is also insoluble in water (e.g., aqueous dispersions). In an example, the activated binder has water solubility of less than 0.1 wt % at 50° C. In another example, the activated binder may have water solubility that is low enough so that none of the activated binder dissolves in the water used in the wet extraction (de-caking) process. It is to be understood that there is no lower limit on the activated binder's solubility in water, and the lower the solubility, the better.

In some examples, the latent binder is a sacrificial intermediate binder in that it is present in various stages of the intermediate part that is formed, and then is ultimately removed (through thermal decomposition) from the at least substantially binder-free part, and thus is not present in the final sintered part.

One example of a sacrificial intermediate latent binder is a latex. As used herein, the term "latex" refers to a polymer that is capable of being dispersed in an aqueous medium, and that is activated upon being heated to the MFFT of the patterning fluid. The latex may be a colloidal dispersion of polymer particles in the liquid vehicle of the patterning fluid.

In some examples disclosed herein, the latex polymer particles are heteropolymers or co-polymers. The heteropolymers may include a more hydrophobic component and a more hydrophilic component. In these examples, the hydrophilic component renders the particles dispersible in the patterning fluid, while the hydrophobic component is capable of coalescing upon reaching the MFFT in order to bind the metallic or ceramic particles together to form the cured intermediate part or layer thereof.

Examples of monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexyl methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of hydrophilic monomers include acrylamide, methacrylamide, monohydroxylated monomers, monoethoxylated monomers, polyhydroxylated monomers, or polyethoxylated monomers.

In some examples of the heteropolymers disclosed herein, the hydrophobic component(s) make up from about 65% to about 100% of the polymer, and the hydrophilic component (s) make up from about 0.1% to about 35% of the polymer.

Some specific examples of the latex polymer particles are formed with the following monomer combinations: i) butyl acrylate, styrene, methyl methacrylate, and methacrylic acid; or ii) butyl acrylate, methyl methacrylate, methacrylic acid, cyclohexyl methacrylate, cyclohexyl acrylate, and 2-phenoxyethyl methacrylate.

The latex polymer particles may have a D50 particle size that can be jetted via thermal inkjet printing or piezoelectric printing or continuous inkjet printing. In an example, the D50 particle size of the latex polymer particles ranges from about 10 nm to about 300 nm.

Other examples of sacrificial intermediate latent binders can be activated by exposure to electromagnetic radiation in the UV range. Examples of these latent binders include epoxy acrylates, aliphatic urethane acrylates, aromatic urethane acrylates, polyester acrylates, and acrylic acrylates. These materials can be present in the patterning solution as monomers or oligomers and are cured into a polymer by exposure to ultraviolet radiation. Further examples include bisphenol A epoxy acrylate, IPDI-based aliphatic urethane acrylate, tripropylene glycol diacrylate, and trimethylol propane triacrylate.

In still other examples, the latent binder is not sacrificial, but rather is a material that is not removed by thermal decomposition and is retained in the final, sintered 3D part. Metal nanoparticles and activated metal salts (e.g., metal salt decomposition products) are examples of latent binder materials that are not removed from the part by thermal decomposition. Examples of metal nanoparticle binders include silver (Ag), copper (Cu), gold (Au), nickel (Ni) and cobalt (Co) nanoparticles. Examples of metal salt binders include copper nitrate ($Cu(NO_3)_2$), iron nitrate ($Fe(NO_3)_3$), cobalt nitrate ($Co(NO_3)_2$), nickel nitrate ($Ni(NO_3)_2$), iron acetate ($Fe(CH_3COO)_2$,) magnesium acetate ($Mg(CH_3COO)_2$), copper sulfate ($CuSO_4$), and manganese sulfate ($MgSO_4$). These metal salts are soluble in the patterning fluid. After exposure to elevated temperature, these metal salts can be activated (decomposed) to become water-insoluble decomposition products, such as metal oxides.

While several example latent binders have been described, in an example of the patterning fluid, the latent binder may be selected from the group consisting of acrylic latex, polyurethane, polyethylene, polypropylene, polyamide, UV curable monomers and oligomers, metal nanoparticles, metal salts and combinations thereof.

The latent binder may be present in the patterning fluid in an amount ranging from about 5 vol % to about 30 vol % (based upon the total volume of the patterning fluid). It is believed that these latent binder loadings provide a balance between the patterning fluid having jetting reliability and binding efficiency.

As mentioned above, the patterning fluid includes the latent binder and the liquid vehicle. As used herein, "liquid vehicle" may refer to the liquid fluid in which the latent binder is dispersed or dissolved to form the patterning fluid. In some examples, the liquid vehicle is aqueous, and thus includes water as a main solvent (e.g., more water than co-solvent). In other examples, the liquid vehicle is non-aqueous, and thus includes more co-solvent than water. In some examples, the liquid vehicle of the patterning fluid may include other ingredients, depending, in part, upon the applicator that is to be used to dispense the patterning fluid. Examples of other suitable liquid vehicle components in the patterning fluid include co-solvent(s), surfactant(s), antimicrobial agent(s), anti-kogation agent(s), and/or sequestering agent(s).

The solvent or co-solvent may be any water soluble or water miscible organic solvent. In some cases, the solvent or co-solvent is a high boiling point organic solvent, which has a boiling point of at least 120° C. Classes of organic solvents/co-solvents that may be used include aliphatic alcohols, aromatic alcohols, diols, glycol ethers, polyglycol ethers, lactams, caprolactams, formamides, acetamides, glycols, and long chain alcohols. Examples of these solvents/co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the patterning fluid may include 2-pyrrolidone, 1,2-butanediol, 2-methyl-1,3-propanediol, 1-(2-hydroxyethyl)-2-pyrrolidone, or combinations thereof.

The co-solvent(s) may be present in the aqueous patterning fluid in a total amount ranging from about 1 wt % to about 50 wt %, based upon the total weight of the liquid vehicle portion of the patterning fluid. In a non-aqueous patterning fluid, the solvent amount may be higher. The amount of the solvent or co-solvent included may depend, in part, upon the applicator to be used for dispensing the patterning fluid. For example, if a piezoelectric inkjet applicator is to be used, water may make up from about 25 wt % to about 30 wt % of the patterning fluid, and the co-solvent may be present in an amount of 35 wt % or more.

In some examples, the liquid vehicle of the patterning fluid includes a coalescing solvent. In these examples, the coalescing solvent may plasticize the latent binder and enhance the coalescing of the binder particles upon reaching the MFFT in order to temporarily bind the metallic or ceramic particles together to form the cured intermediate part or a layer thereof.

In some examples, the coalescing solvent may be a lactone, such as 2-pyrrolidinone, 1-(2-hydroxyethyl)-2-pyrrolidone, etc. In other examples, the coalescing solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, etc. In still other examples, the coalescing solvent may be a water-soluble polyhydric alcohol, such as 2-methyl-1,3-propanediol, etc. In still other examples, the coalescing solvent may be selected from any of the listed solvents or may be a combination of the listed solvents.

The coalescing solvent may be present in an amount ranging from about 0.1 wt % to about 50 wt % (based upon the total weight of the liquid vehicle portion of the patterning fluid). In some examples, greater or lesser amounts of the coalescing solvent may be used depending, in part, upon the architecture of the applicator to be used to apply the patterning fluid.

As mentioned above, in some examples, the liquid vehicle of the patterning fluid includes surfactant(s). Surfactant(s) may be used to improve the jettability of the patterning fluid. Examples of suitable surfactants include any of the surfactants listed above in reference to the build material slurry.

When a single surfactant is used or a combination of surfactants is used, the total amount of surfactant(s) in the liquid vehicle portion of the patterning fluid may range from about 0.01 wt % to about 10 wt %. In an example, the total amount of surfactant(s) in the patterning fluid may be about 3 wt %, based on the total weight of the liquid vehicle portion.

The liquid vehicle of the patterning fluid may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the liquid vehicle portion of the patterning fluid may include a total amount of antimicrobial agents that ranges from about 0.05 wt % to about 1 wt %. In an example, the antimicrobial agent(s) is/are a biocide(s) and is/are present in the liquid vehicle portion of the patterning fluid in an amount of about 0.25 wt % (based on the total weight of the patterning fluid).

An anti-kogation agent may be included in the patterning fluid 20. Kogation refers to the deposit of dried solids of the patterning fluid on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) acrylic acid polymer (e.g., commercially available as CARBOSPERSE™ K-7028 from Lubrizol).

Whether a single anti-kogation agent is used or a combination of anti-kogation agents is used, the total amount of anti-kogation agent(s) in the liquid vehicle portion of the patterning fluid may range from greater than 0.20 wt % to about 0.62 wt %. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %, where these amounts are based on the total weight of the liquid vehicle portion of the patterning fluid.

Sequestering agents (or chelating agents) may be included in the liquid vehicle of the patterning fluid to eliminate the deleterious effects of heavy metal impurities. Examples of suitable sequestering agents include disodium ethylenediaminetetraacetic acid (EDTA-Na), ethylene diamine tetra acetic acid (EDTA), and methylglycinediacetic acid (e.g., TRILON® M from BASF Corp.).

Whether a single sequestering agent is used or a combination of sequestering agents is used, the total amount of sequestering agent(s) in the patterning fluid may range from greater than 0 wt % to about 2 wt %, based on the total weight of the liquid vehicle. In an example, the sequestering agent(s) is/are present in the patterning fluid in an amount of about 0.04 wt % (based on the total weight of the liquid vehicle).

In the examples described herein, the balance of the liquid vehicle in the patterning fluid is water. As an example, deionized water or purified water may be used. As noted herein, the water amount may vary depending upon the jetting architecture. Water may be a secondary solvent when piezoelectric printheads are used, and water may be the primary solvent when thermal inkjet printheads are used.

In one example of the patterning fluid, the latent binder may be acrylic latex, and the liquid vehicle may include 2-methyl-1,3-propanediol, 2-pyrrolidone, a non-ionic surfactant, a fluorosurfactant and a balance of water.

Three-Dimensional Printing Kit

The build material slurry and the patterning fluid may be part of a three-dimensional printing kit. In an example, the three-dimensional printing kit comprises i) a shear thinning build material slurry including metallic or ceramic particles having an individual particle size up to about 20 μm, a hydrocolloid present in an amount ranging from about 0.05 percent by volume to less than 0.5 percent by volume of the shear thinning build material slurry, and water; and ii) a patterning fluid including a latent binder in a liquid vehicle.

Any example of the slurry and the patterning fluid disclosed herein may be used in the 3D printing kit.

It is to be understood that the slurry and patterning fluid of the 3D printing kit may be maintained separately until used together in examples of the 3D printing method disclosed herein. The slurry and patterning fluid may each be contained in one or more containers prior to and during printing, but may be combined together during printing. The containers can be any type of a vessel (e.g., a reservoir), box, or receptacle made of any material.

3D Printing System

Referring now to FIG. 1, an example of a 3D printing system 10 is schematically depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

In an example, the three-dimensional (3D) printing system 10 generally includes a supply 14 of a build material slurry 16 including: metallic or ceramic particles 30; a hydrocolloid 32; and water 34; a build material dispenser 17; in some instances, a build material distributor 18; a supply of a patterning fluid 20 including a latent binder 22; an applicator 24 for selectively dispensing the patterning fluid 20; a source 26, 26' (of heat and/or radiation); and a controller 28. A non-transitory computer readable medium may have stored thereon computer executable instructions to cause the controller 28 to process data and in response: to control the build material supply 14, the build material dispenser 17, and (in some instances) the build material distributor 18 to expose the build material slurry to a shear rate greater than about 100 $s^{-1}$, thereby reducing a viscosity of the build material slurry to less than 10 $Pa \cdot s^{-1}$, and while the viscosity is reduced, apply the build material slurry 16 to form a slurry layer 36; to control the heat and/or radiation source 26, 26' to allow or cause evaporation of at least some water 34 from the slurry layer 36 to form a build material layer 38 (see FIG. 3B); and to control the applicator 24 to selectively apply the patterning fluid 20 on at least a portion 40 (see, e.g., FIG. 3C) of the build material layer 38.

As shown in FIG. 1, the printing system 10 includes the build area platform 12, the build material supply 14 containing the build material slurry 16, and the build material dispenser 17. In some instances (as shown in FIG. 3A), the printing system 10 also includes the build material distributor 18.

The build area platform 12 is a substantially horizontal build platform that does not function as a mold for the build material slurry 16 applied thereto. Rather, the build area platform is a flat surface upon which the build material slurry 16 can be applied and patterned to define any desirable shape. The build area platform receives the build material slurry 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

Figures 3E, 3F, 3G:
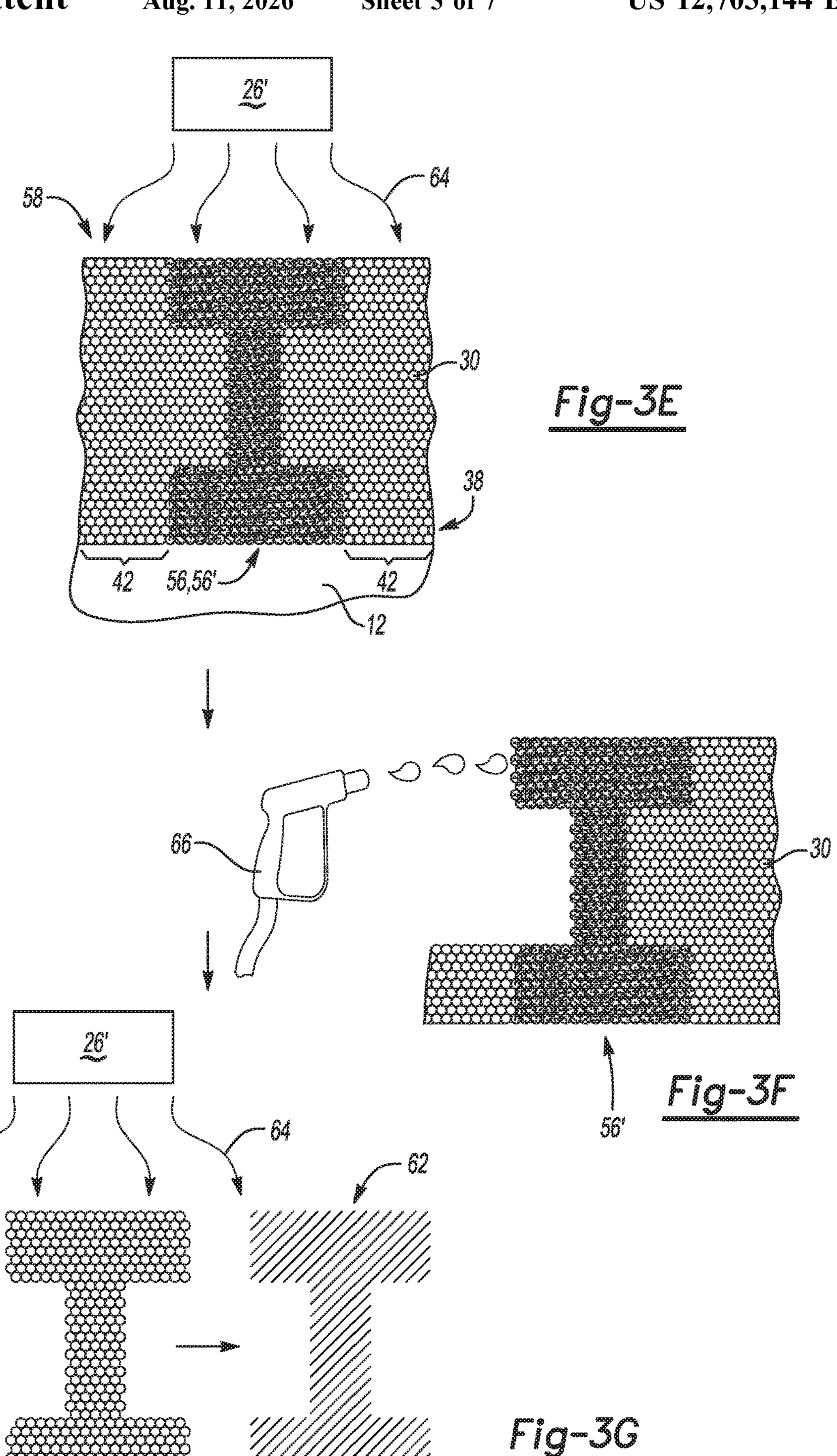

The build area platform 12 may be moved in a direction as denoted by the arrow 44, e.g., along the Z-axis, so that the build material slurry 16 may be delivered to the platform 12 or to a previously patterned layer of the patterned intermediate part 56 (see, e.g., FIG. 3E). In an example, when the build material slurry 16 is to be delivered, the build area platform 12 may be programmed to advance (e.g., downward) enough so that the build material dispenser 17 can deposit the build material slurry 16 onto the platform 12 and the build material distributor 18 can push the build material slurry 16 across the platform 12 to form a slurry layer 36 of the build material slurry 16 thereon. The build area platform 12 may also be returned to its original position, for example, when a new intermediate part 56, 56' (FIG. 3E) is to be built.

The build material supply 14 may be a container, bed, or other vessel or surface that is to deliver the build material slurry 16 to the build material dispenser 17. In the example shown, the build material supply 14 is a remote vessel that feeds the slurry 16 into the build material dispenser 17 from above through a tube or other fluid conduit. In some instances, the build material supply 14 may be part of the build material dispenser 17, and thus may translate with the build material dispenser 17. Additionally, or alternatively, the build material supply 14 may include a mechanism (e.g., a delivery piston or pump) to provide, e.g., move, the build material slurry 16 from a storage location to a position to be spread onto the build area platform 12 or onto a previously patterned layer of the patterned intermediate part 56. For example, the build material supply 14 may be a stationary container located at the side of the printing system 10, and its delivery mechanism can push the build material slurry 16 into a position where it can be spread across the build area platform 12, e.g., by the build material distributor 18.

The build material slurry 16 in the build material supply 14 may be mixed, stirred, pumped or otherwise agitated to ensure that the slurry 16 composition remains at least substantially uniform throughout the build material slurry volume.

The build material dispenser 17 receives the build material slurry 16 from the build material supply 14 and delivers the build material slurry 16 locally to the build area platform 12. The build material dispenser 17 may be moved in a direction as denoted by the arrow 46, e.g., along the Y-axis, cross the build area platform 12 to deliver the build material slurry 16 to the build area platform 12. In one example, the build material dispenser 17 is a slot die coater. As shown in FIG. 1, the build material dispenser 17 alone may dispense the build material slurry 16 to form a layer 36.

In other examples, the build material dispenser 17 and the build material dispenser 18 (FIG. 3A) are used together to form the layer 36. The build material distributor 18 is the mechanism that may be used to spread the dispensed build material slurry 16 into the layer 36. The build material distributor 18 may be moved in a direction as denoted by the arrow 46, e.g., along the Y-axis, across the build area platform 12 to spread the dispensed build material slurry 16 into a slurry layer 36 over the build area platform 12. The build material distributor 18 may also be returned to its original position following the spreading of the build material slurry 16. The build material distributor 18 may be a blade (e.g., a doctor blade), a roller, a combination of a roller and a blade, and/or any other device capable of spreading the build material slurry 16 over the build area platform 12. For instance, the build material distributor 18 may be a counter-rotating roller.

In some examples (see FIG. 3A), the build material dispenser 17 may translate along with the build material distributor 18 such that build material slurry 16 is continuously delivered and spread. Continuous delivery of build material slurry 16 to the dispenser 17 can reduce the time for settling of the metallic or ceramic particles 30 in the slurry 16 prior to spreading and can prevent premature drying of the slurry supply material. A slot die coater is an example of a slurry dispenser 17 that translates across the build area platform 12 as it meters the slurry 16. In some examples, more than one distribution method may be employed to meter and spread the slurry 16. For example, as shown in FIG. 3A, a slot die coater (e.g., dispenser 17) can be used in conjunction with a doctor blade (e.g., distributor 18), wherein the slot die coater feeds the slurry 16 to the build area platform 12 in advance of a doctor blade that spreads the slurry 16 to create a slurry layer 36 of the desired thickness. As will be described in more detail with the method 100 (see FIG. 2), the build material dispenser 17, alone or in combination with the build material distributor 18, may apply the high shear to reduce the viscosity of the slurry 16.

As shown in FIG. 1, the printing system 10 also includes an applicator 24 for selectively applying the patterning fluid 20. In some examples, the applicator 24 is an inkjet applicator 24.

The inkjet applicator 24 may include a reservoir containing the patterning fluid 20. The inkjet applicator 24 may also include nozzles, fluid slots, and/or fluidics for dispensing the patterning fluid 20. The inkjet applicator 24 may be a thermal inkjet printhead or print bar, a piezoelectric printhead or print bar, or a continuous inkjet printhead or print bar. While a single inkjet applicator 24 is shown in FIG. 1, it is to be understood that multiple inkjet applicators 24 may be used.

The inkjet applicator 24 may be scanned across the build area platform 12 in the direction indicated by the arrow 48, e.g., along the Y-axis. The inkjet applicator 24 may extend across a width of the build area platform 12. The inkjet applicator 24 may also be scanned along the X-axis, for instance, in configurations in which the inkjet applicator 24 does not span the width of the build area platform 12 to enable the inkjet applicator 24 to deposit the patterning fluid 20 over a large area of a build material layer 38 (FIGS. 3B and 3C). The inkjet applicator 24 may thus be attached to a moving XY stage or a translational carriage 50 that moves the inkjet applicator 24 adjacent to the build area platform 12 in order to deposit the patterning fluid 20 in predetermined areas 40 (see FIG. 3C) of a build material layer 38 that has been formed on the build area platform 12 in accordance with the method 100 disclosed herein. The inkjet applicator 24 may include a plurality of nozzles (not shown) through which the patterning fluid 20 is to be selectively ejected.

The inkjet applicator 24 may deliver drops of the patterning fluid 20 at a desired resolution. In one example, the resolution ranges from about 300 dots per inch (DPI) to about 2400 DPI. In other examples, the inkjet applicator 24 may deliver drops of the patterning fluid 20 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. In some examples, the inkjet applicator 24 is able to deliver variable drop volumes of the patterning fluid 20. One example of a suitable printhead has 1200 DPI resolution and can delivery drop volumes ranging from about 6 pl to about 14 pl.

As shown in FIG. 1, the printing system 10 may also include the heat and/or radiation source 26, 26'. In some examples, the heat and/or radiation source 26, 26' may be a heater. In other examples, the heat and/or radiation source 26, 26' may be a source of electromagnetic radiation. In an example, evaporation of the water 34 of the slurry layer 36 is accomplished by heating the slurry layer 36 by the heat and/or radiation source 26, 26'. In another example, when the latent binder 22 is to be activated by heat, the heat and/or radiation source 26, 26' may be used to supply suitable thermal energy. In some examples, the heat and/or radiation source 26, 26' may be a conductive heater or a radiative heater (e.g., infrared lamps) that is part of the printing system 10. In these examples, the heat and/or radiation source 26, 26' of the printing system 10 may be used to heat an entire build material cake 58 (see, e.g., FIG. 3E) during printing or after the patterning is finished. These types of heat and/or radiation sources 26' may be placed below the build area platform 12 (e.g., conductive heating from below the platform 12) and/or along the sides of the build volume or may be placed above the build area platform 12 (e.g., radiative heating of the build material layer surface).

The additional heating processes, e.g., sintering or de-binding and sintering, may take place in a heater that is separate from the printing system 10. Examples of the separate heater include a conventional furnace or oven, a microwave, or devices capable of hybrid heating (i.e., conventional heating and microwave heating). This type of separate heater may be used for heating the cured intermediate part 56' (see, e.g., FIG. 3E) after it is removed from the printing system 10. In other examples, patterning may take place in the printing system 10, and then the build material platform 12 with the patterned intermediate part 56 thereon may be detached from the system 10 and placed into the separate heater for curing/activation. Once the cured intermediate part 56' is formed, the build material cake 58 may be removed and the cured intermediate part 56' may be separated from the build material cake 58, and then sintering, or de-binding and sintering may take place in the separate heater.

The heat and/or radiation source 26, 26' may be a source 26, 26' of electromagnetic radiation when the latent binder 22 is to be activated by heat, infrared or ultraviolet radiation. The source 26, 26' of electromagnetic radiation may emit infrared radiation having wavelengths ranging from about 800 nm to about 2 mm, which may be used for evaporation and/or thermal activation of the latent binder 22. As another example, the electromagnetic radiation may be ultraviolet radiation having wavelengths ranging from about 100 nm to about 400 nm, which may be used for UV activation of the latent binder 22. In this example, the source 26, 26' of electromagnetic radiation may be ultraviolet (UV) light sources, such as UV curing lamps, UV light emitting diodes (LED), xenon (Xe) flash lamps, or lasers with the desirable UV electromagnetic wavelengths. As still another example, the electromagnetic radiation may be visible light having wavelengths ranging from about 400 nm to about 800 nm, which may be used for evaporation and/or thermal activation of the latent binder 22. In this example, the source 26, 26' of electromagnetic radiation may be visible light sources, such as incandescent lamps, fluorescent lamps, Xe flash lamps, light emitting diodes (LED), or lasers with the desirable visible electromagnetic wavelengths.

As depicted in FIG. 1, the heat and/or radiation source 26, 26' may be a stationary lamp 26' or a moving lamp 26. The stationary lamp 26' may be in a fixed position relative to the build area platform 12, and may be turned on when heat exposure is desired and off when heat exposure is not desired. The moving lamp(s) 26 can be mounted on a track (e.g., translational carriage 50) to move across the build area platform 12 in a direction as denoted by the arrow 48, e.g., along the Y-axis. This allows for printing and heating in a single pass. Such lamps 26 can make multiple passes over the build area platform 12 depending on the amount of exposure utilized in the method(s) disclosed herein. In the example shown in FIG. 1, the lamps 26 are mounted at opposite ends of the inkjet applicator 24 so that heat can be applied to the build material slurry 16 immediately before the patterning fluid 20 is deposited and/or immediately after the patterning fluid 20 is deposited, depending on the movement of the translational carriage 50. In an example, the moving lamp 26 at the left side of the translational carriage 50 may be a leading lamp and the moving lamp 26 at the right side of the translational carriage 50 may be a trailing lamp.

The heat and/or radiation source 26, 26' may heat and/or irradiate the entire build area platform 12 with a substantially uniform amount of energy. This can selectively activate the latent binder particles 22 in the portions 40 of the metallic or ceramic particles 30 patterned with the patterning fluid 20, while leaving the non-patterned portion(s) 42 (see, e.g., FIG. 3C) of the metallic or ceramic particles 30 unbound.

The heat and/or radiation source 26, 26' may be operatively connected to a lamp/laser/LED driver, an input/output temperature controller, and temperature sensors, which are collectively shown as heat system components 52. The heat system components 52 may operate together to control the heat and/or radiation source 26, 26'. The temperature recipe (e.g., heat/radiation exposure rate) may be submitted to the input/output temperature controller. During heating, the temperature sensors may sense the temperature of the metallic or ceramic particles 30, and the temperature measurements may be transmitted to the input/output temperature controller. For example, a thermometer associated with the heated area can provide temperature feedback. The input/output temperature controller may adjust the heat source 26, 26' power set points based on any difference between the recipe and the real-time measurements. These power set points are sent to the lamp/laser drivers, which transmit appropriate lamp/laser voltages to the heat and/or radiation source 26, 26'. This is one example of the heat system components 52, and it is to be understood that other heat source control systems may be used. For example, the controller 28 may be configured to control the heat and/or radiation source 26, 26'.

Each of these physical elements may be operatively connected to the controller 28 of the printing system 10. The controller 28 may process print data that is based on a 3D object model of the 3D object/part to be generated. In response to data processing, the controller 28 may control the operations of the build area platform 12, the build material supply 14, the build material dispenser 17, the build material distributor 18, the inkjet applicator 24, and the heat source 26, 26'. As an example, the controller 28 may control actuators (not shown) to control various operations of the 3D printing system 10 components. The controller 28 may be a computing device, a semiconductor-based microprocessor, a central processing unit (CPU), an application specific integrated circuit (ASIC), and/or another hardware device. Although not shown, the controller 28 may be connected to the 3D printing system 10 components via communication lines.

The controller 28 manipulates and transforms data, which may be represented as physical (electronic) quantities within the printer's registers and memories, in order to control the physical elements to create the intermediate part 56, 56' (FIG. 3E). As such, the controller 28 is depicted as being in communication with a data store 54. The data store 54 may include data pertaining to a 3D part to be printed by the 3D printing system 10. The data for the selective delivery/application of the build material slurry 16 and the patterning 20 may be derived from a model of the 3D part to be formed. For instance, the data may include how much heat to apply evaporate the water 34 from the slurry layer 36, the locations on each build material layer 38 that the inkjet applicator 24 is to deposit the patterning fluid 20, and the manner in which the latent binder 22 is to be cured. In one example, the controller 28 may use the data to control the heat source 26, 26' to heat the slurry layer 36, then the controller 28 may use the data to control the inkjet applicator 24 to selectively apply the patterning fluid 20, and then the controller 28 may use the data to control the heat source 26, 26' to activate the latent binder 22. The data store 54 may also include machine readable instructions (stored on a non-transitory computer readable medium) that are to cause the controller 28 to control the amount of build material slurry 16 that is supplied by the build material supply 14, the movement of the build area platform 12, the movement of the build material dispenser 17 and/or the build material distributor 18, the movement of the inkjet applicator 24, the movement of the heat source 26, 26', etc.

3D Printing Method

Referring now to FIG. 2, a flow diagram of an example of the 3D printing method 100 is depicted. The method 100 includes exposing a build material slurry 16 including metallic or ceramic particles 30, a hydrocolloid 32, and water 34 to a shear rate greater than about 100 $s^{-1}$, thereby reducing a viscosity of the build material slurry 16 to less than 10 Pa·$s^{-1}$ (reference numeral 102); while the viscosity is reduced, applying the build material slurry 16 to form a slurry layer 36 (reference numeral 104); evaporating at least some of the water 34 from the slurry layer 36 to form a build material layer 38 (reference numeral 106); and selectively applying a patterning fluid 20 on at least a portion 40 of the build material layer, the patterning fluid including a latent binder (reference numeral 108).

FIG. 3A through FIG. 3G schematically depict the 3D printing method 100. Prior to execution of the method 100 or as part of the method 100, the controller 28 may access data stored in the data store 54 pertaining to a model of the 3D object or part. The controller 28 may determine the number of build material layers 38 from the 3D part or object model, the locations at which patterning fluid 20 from the inkjet applicator 24 is to be deposited on each of the respective layers, and other data to be used during the 3D printing process.

FIG. 3A schematically depicts reference numerals 102 and 104 of the method 100. In particular, FIG. 3A depicts the build material slurry 16 being dispensed (where it is exposed to a shear rate greater than about 100 $s^{-1}$ in order to reduce its viscosity), and also depicts the build material slurry 16 being applied, e.g., spread, to form a slurry layer 36 while the viscosity is reduced.

The build material dispenser 17, alone or in combination with the distributor 18, may be used to expose the slurry 16 to the high shear rate and to apply the slurry 16 on the build area platform 12. In some examples, the applying of the build material slurry 16 is accomplished using a slot die coater, a doctor blade coater, a rod coater, a knife coater, or combinations thereof. In other examples, the applying of the build material slurry 16 is accomplished using a slot die coater, alone or in combination with a doctor blade coater, a rod coater, a knife coater, or combinations thereof. When the coater is operated, the shear rate applied to the slurry 16 in contact with the coater is increased. In one example, the operation of the slot die coater forces the slurry 16 through the slot, and the shear rate applied to the slurry 16 increases (as opposed to when the slot die coater is at rest). In other examples, the operation of the doctor blade coater, the rod coater, or the knife coater forces the slurry 16 to pass beneath, respectively, a doctor blade, a rod, or a knife, where the shear rate applied to the slurry 16 increases. When a doctor blade is used, the shear rate applied to the slurry 16 may range anywhere from about 250 $s^{-1}$ to about 10,000 $s^{-1}$.

At the low shear rate(s) (e.g., 1 $s^{-1}$ or less), the viscosity of the build material slurry 16 is 30 Pa·$s^{-1}$ or higher. As one example, at a shear rate of 0.1 $s^{-1}$, the viscosity may be 100 Pa·$s^{-1}$ or higher. As another example, at a shear rate of 0.01 $s^{-1}$, the viscosity may be 800 Pa·$s^{-1}$ or higher. At these increased viscosities, the build material slurry 16 has a thick, gel-like consistency.

When the shear rate is increased from a low value to a higher value (e.g., 100 $s^{-1}$ or more), the viscosity of the build material slurry 16 decreases. In some instances, the viscosity decreases by at least a factor of 30. The reduced viscosity is less than 10 Pa·$s^{-1}$, and in some instances, is less than 5 Pa·$s^{-1}$. At the reduced viscosity, the build material slurry 16 has a flowable consistency, and thus can be easily spread into a slurry layer 36. When the viscosity of the build material slurry 16 is reduced, the build material dispenser 17 may deposit, and the build material distributor 18 may spread, the build material slurry 16 onto the build area platform 12 to form the slurry layer 36.

The build material slurry 16 is thixotropic, and responds quickly to changes in shear rate. Thus, within milliseconds, or at most seconds of the shear rate being increased, the viscosity of the build material slurry 16 reduces and the slurry 16 becomes flowable. Similarly, within seconds of the shear rate being decreased, the viscosity of the build material slurry 16 increases, and the slurry becomes a thick gel. Thus, the rheological properties of the build material slurry 16 enable controlled flowability, contribute to a reduction in lost slurry 16 (e.g., leakage from the build material dispenser 17), and provide desirable stability at low shear rates.

As shown in FIG. 3A, the slurry layer 36 is applied across a width of a substantially horizontal build area platform 12. As described herein, this platform 12 is a support upon which the slurry 16 is applied and patterned, but is not a mold that shapes the slurry 16.

FIG. 3B schematically depicts reference numeral 106 of the method 100. In particular, FIG. 3B depicts evaporating at least some of the water 34 from the slurry layer 36 to form the build material layer 38. In FIG. 3B, as the water 34 evaporates, the hydrocolloid 32 may form a hydrocolloid glue 32' that coats the metallic or ceramic particles 30 and holds them in place in the build material layer 38. Enough water 34 may be evaporated from the slurry layer 36 so that sufficient empty volume is created between metallic or ceramic particles 30 in the build material layer 38 to accommodate the application of the patterning fluid 20 containing the latent binder 22. As an example, for a build material layer thickness of 50 μm, a drop volume for jetted patterning fluid of 10 pL, a printing resolution of 600 DPI, and a metallic powder packing fraction of 0.5, at least 33% of the water should be evaporated prior to application of the patterning fluid 20. In the example shown in FIG. 3B, some of the water 34 remains in the build material layer 38. In another example, shown in FIG. 3B, the water 34 is completely evaporated from the build material layer 38.

In some examples of the method 100, the evaporating is accomplished by heating the slurry layer 36. In these examples, heating may take place at a temperature and for a time period that is capable of evaporating at least some of the water 34. In an example, the evaporation temperature may be above ambient temperature.

As used therein, “ambient temperature” may refer to room temperature (e.g., ranging about 18° C. to about 22° C.), or to the temperature of the environment in which the 3D printing method 100 is performed. Examples of the 3D printing environment ambient temperature may range from about 40° C. to about 50° C. As additional build material layers 38 are generated, the temperature of the resulting build area powder cake 58 (FIG. 3E) may be controlled by heaters 26 in the build area platform 12 and/or along the sides of the build volume. Examples of build area powder cake temperature may range from about 40° C. to about 100° C.

Evaporation of water 34 from the most recently applied slurry layer 36 is dependent on the temperature of that layer 36. Both the ambient temperature and powder cake temperature can influence the temperature of the recently applied slurry layer 36. Additional control of the slurry layer temperature is provided by heaters 26, 26' that can deliver energy (e.g., by radiation) to the upper surface of the recently applied slurry layer 36. Energy from heaters 26, 26' can rapidly heat the recently applied slurry layer 36 in order to accelerate evaporation. However, it is desirable to maintain the evaporation temperature below a decomposition temperature of the hydrocolloid 32. For the hydrocolloids 32 disclosed herein, the upper limit of the evaporation temperature ranges from about 100° C. to about 150° C. Above this temperature threshold, the hydrocolloid 32 may chemically degrade into a volatile species and leave the build material layer 38, and thus would stop performing its temporary binding function, or may be chemically modified in a manner that prevents subsequent dissolution in water. For some build material slurries 16, the evaporation temperature ranges from about 80° C. to about 120° C. As still another example, the evaporation temperature may range from about 70° C. to about 90° C.

The evaporation time may also depend, in part, on the evaporation temperature and/or the thickness of the slurry layer 36. For example, a higher evaporation temperature and/or a thinner slurry layer 36 may result in a shorter evaporation time period, and a lower evaporation temperature and/or a thicker slurry layer 36 may result in a longer evaporation time period. Evaporation, and thus the formation of the build material layer 38, may vary, depending upon the temperature, humidity, and/or air circulation. For some build material slurries 16, the evaporation time period ranges from about 1 second to about 20 seconds per layer 36. In an example, the evaporation time period is about 5 seconds.

Evaporating at least some of the water 34 allows the hydrocolloid 32 to weakly bind the metallic or ceramic particles 30 and forms the build material layer 38. Evaporating at least some of the water 34 also creates space(s) between the metallic or ceramic particles 30 so that the patterning fluid 20 may penetrate the build material layer 38. Evaporation of the water 34 also may result in the densification of the metallic or ceramic particles 30 through capillary action.

The thickness of the build material layer 38 may be about the same as or less than the thickness of the slurry layer 36. In an example, the build material layer 38 may densify up to about 25% with respect to the slurry layer 36. In an example, the thickness of the slurry layer 36 may be about 100 μm and the thickness of the build material layer is about 75 μm. In an example, the build material layer 38 has a thickness ranging from about 30 μm to about 150 μm. In another example, the thickness of the build material layer 38 is about 100 μm. In still another example, the thickness of the build material layer 38 ranges from about 50 μm to about 80 μm, although thinner or thicker layers may also be used. For example, the thickness of the build material layer 38 may range from about 20 μm to about 300 μm. The layer thickness may be about 1.2 (i.e., 1.2 times) the D90 particle size at a minimum for finer part definition. In some examples, the layer thickness may be about 3× the D90 particle size.

As shown at reference numeral 108 in FIG. 2 and in FIG. 3C, the method 100 continues by selectively applying the patterning fluid 20 on at least a portion 40 of the build material layer 38.

The patterning fluid 20 may be dispensed from the applicator 24. As mentioned above, the applicator 24 may be a thermal inkjet printhead, a piezoelectric printhead, etc. As such, the selectively applying of the patterning fluid 20 may be accomplished by thermal inkjet printing, piezo electric inkjet printing, etc.

The controller 28 may process data, and in response, control the inkjet applicator 24 (e.g., in the directions indicated by the arrow 48) to deposit the patterning fluid 20 onto predetermined portion(s) 40 of the build material layer 38 that are to become part of the patterned intermediate part 56 (FIG. 3E) and are to ultimately be sintered to form the sintered part 62 (FIG. 3G). The inkjet applicator 24 may be programmed to receive commands from the controller 28 and to deposit the patterning fluid 20 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 3C, the inkjet applicator 24 selectively applies the patterning fluid 20 on those portion(s) 40 of the build material layer 38 that is/are to become the first layer of the sintered part 62. As an example, if the 3D part that is to be formed is to be shaped like a cube or cylinder, the patterning fluid 20 may be deposited in a square pattern or a circular pattern (from a top view), respectively, on at least a portion 40 of the build material layer 38. The 3D part can also be printed at an angle or another orientation.

It is to be understood that a single patterning fluid 20 may be selectively applied to pattern the build material layer 38, or multiple patterning fluids 20 may be selectively applied to pattern the build material layer 38.

The volume of the patterning fluid 20 that is applied per unit of the metallic or ceramic particles 30 in the patterned portion 40 may be sufficient to provide enough of the latent binder 22 so that the metallic or ceramic particles 30 in the patterned portion 40 will be bound together with enough mechanical strength to withstand the extraction process. The volume of the patterning fluid 20 that is applied per unit of the metallic or ceramic particles 30 in the patterned portion 40 may depend, at least in part, on the latent binder 22 used, the latent binder loading in the patterning fluid 20, and the metallic or ceramic particles 30 used.

It is to be understood that portions 42 of the build material layer 38 that do not have the patterning fluid 20 applied thereto also do not have the latent particles 22 introduced thereto. As such, these portions 42 do not become part of the patterned intermediate part 56 that is ultimately formed.

When the patterning fluid 20 is applied to the build material layer 38, the liquid vehicle is capable of wetting the metallic or ceramic particles 30 and the latent binder 22 is capable of penetrating into the microscopic pores/voids of the build material layer 38 (i.e., the spaces between the metallic or ceramic particles 30). In an example, the latent binder 22 in the patterning fluid 20 can then be activated or cured.

In the examples disclosed herein, the latent binder 22 may be activated or cured within each patterned build material layer 38, or after several patterned build material layers have been built up to form an intermediate part 56.

In the layer-by-layer activation or curing process, the latent binder 22 may form a substantially continuous network/continuous polymer phase/glue 22' (also referred to herein as the activated binder 22') within each layer 38, and when all of the layers are printed (patterned and cured), the cured intermediate part 56' is formed. An example of the substantially continuous network/continuous polymer phase/glue 22' in one layer 38 is shown in FIG. 3D.

Alternatively, several build material layers 38 can be built up to form an intermediate part 56. In this example, the patterning fluid 20 is applied in each layer, but the latent binder 22 is not activated/cured until the entire intermediate part 56 is patterned. After the intermediate part 56 is formed, the latent binder 22 is activated or cured to form an at least substantially continuous network/continuous polymer phase/glue 22' that glues the metallic or ceramic particles 30 of several patterned layers into the cured intermediate part 56'.

In some examples, the latent binder 22 may be activated by heating to an activation temperature. The activation temperature equals or exceeds the MFFT of the patterning fluid 20. At temperatures at or above the MFFT, the latent particles 22 coalesce and form the polymer glue 22' that coats the metallic or ceramic particles 30 and creates the cured intermediate part 56' or a cured layer thereof. In other words, at or above the MFFT, the latent binder particles 22 coalesce to form a continuous network 22' that binds the patterned volume of metallic or ceramic particles 30 together.

In other examples, the latent binder 22 may be activated by electromagnetic radiation exposure. When the latent binder 22 is exposed to the electromagnetic radiation, the electromagnetic radiation may cross-link the latent binder 22 to form the glue 22' that coats the metallic or ceramic particles 30 and creates the cured intermediate part 56' or a layer thereof. In some examples, the latent binder 22 is activated by ultraviolet (UV) radiation (e.g., wavelengths ranging from about 100 nm to about 400 nm).

It is to be understood that when the latent binder 22 is to be activated by electromagnetic radiation, it may be desirable to apply the build material slurry 16 in thin slurry layers 36, and form thin build material layers 38 (e.g., layers 38 having a thickness ranging from about 20 μm to about 80 μm). It may be desirable to use such thin layers 38 so that the electromagnetic radiation may penetrate through the entire thickness of the build material layer 38 to substantially cure the latent binder 22 in that layer 38. The electromagnetic radiation may be unable to penetrate deeper into the layer 38 because the metallic or ceramic particles 30 may block the electromagnetic radiation. As such, layer-by-layer activation may be desirable with these types of latent binders 22. Layer by layer activation builds the cured intermediate part 56' one layer at a time. Exposure of some UV curable resins to elevated temperature can at least partially cure the resin or can accelerate the curing process. Application of thermal energy by either conductive or radiative heating from heaters 26, 26' during UV curing may facilitate polymerization.

For effective curing via UV, most, if not all, of the water in the patterning fluid 20 may be evaporated before UV exposure. Sufficient energy can be supplied from the heaters 26, 26' to ensure evaporation of the water of the patterning fluid 20 from the patterned portion 40.

Following the application of the patterning fluid 20 (which adds more water to the build material layer 38), enough water may be evaporated from the patterned build material layer so that the latent binder 22, when activated, may bind the metallic or ceramic particles 30 together through the entire thickness of the build material layer(s) 38. Whether activation or curing takes place in the layer-by-layer fashion or after the formation of the intermediate part 56, it is to be understood that a minimum of 50% of the water volume should be evaporated from the patterned build material layer 38 prior to application of a subsequent slurry layer 36. The removal of additional liquid (e.g., water) from the patterned portion 40 may be accomplished by additional heating that is sufficient to drive off the liquid.

In some examples, the latent binder 22 may be an inorganic material such as a metal salt or metal nanoparticles. Curing of metal salt or metal nanoparticle binders involves evaporation of most of the carrier liquid from the patterning fluid 20. In an example, applied heat and/or the radiation source 26, 26' may be used to elevate the temperature of the patterned portion 40 to facilitate evaporation. Cured metal salt and/or metal nanoparticle binders form connecting bridges (e.g., activated latent binder 22) between build material particles 30, thereby creating a green part 56, 56' with sufficient strength to extracted from the build area platform 12.

As mentioned above, some examples of the method 100 involve activating (e.g., curing) the latent binder 22 in a layer-by-layer process. In these examples, the method 100 further comprises removing at least some liquid (e.g., water) of the patterning fluid 20 from the at least the portion 40 of the build material layer 38; and activating the latent binder 22 in the at least the portion 40 of the build material layer 38.

As shown in FIG. 3D, the build material layer 38 may be exposed to heating using the heat and/or radiation source 26 after the patterning fluid 20 is applied to the build material layer 38 and before another build material layer 38 is formed. In an example, the heat and/or radiation source 26 may be used to heat the build material layer 38 to evaporate the water and to activate the latent binder 22 during printing layer-by-layer, and for producing a stabilized and cured intermediate part layer. In these examples, heating to form the cured intermediate part layer may take place at a temperature that is capable of activating (or curing) the latent binder 22 of the patterning fluid 20, but that is not capable of thermally decomposing the latent binder 22, or of sintering the metallic or ceramic particles 30. The activation/curing temperature may be capable of thermally decomposing some examples of the hydrocolloid 32, and not be capable of thermally decomposing other examples of the hydrocolloid 32. Examples of suitable activation temperatures are provided below. In another example, the heat and/or radiation source 26 may be used to heat to at least partially remove the liquid from the patterning fluid 20 and to expose the build material layer 38 to UV radiation to activate the latent binder 22 during printing layer-by-layer, and for producing a stabilized and cured intermediate part layer. In these examples, exposure to UV radiation to form the cured intermediate part layer may take place at a wavelength that is capable of cross-linking (or curing) the latent binder 22.

In the examples in which each individual build material layer 38 is exposed to heating and/or electromagnetic radiation using the heat and/or radiation source 26, the processes shown in FIGS. 3A-3D may be repeated to iteratively build up several cured layers and to produce the cured intermediate part 56'. The cured intermediate part 56' can then be exposed to the processes described in reference to FIGS. 3F and 3G. As such, these examples of the method 100 may further comprise repeating the exposing, the applying, the evaporating, the selectively applying, the removing, and the activating to form a cured intermediate part 56'; extracting the cured intermediate part from a build material volume (e.g., build material cake 58 in FIG. 3E) to remove any non-patterned metallic or ceramic particles 30 (FIG. 3E); and heating the cured intermediate part 56' to form a sintered part 62 (FIG. 3G).

Also mentioned above, some examples of the method 100 involve forming the intermediate part 56 (in which the latent binder 22 is not yet activated/cured). In these examples, after the application of the patterning fluid 20, the method 100 further comprises: removing at least some liquid (e.g., water) of the patterning fluid 20 from the at least the portion 40 of the build material layer 38; then repeating each of: the exposing of the build material slurry 16 to the high shear rate, the applying of the build material slurry 16, the evaporating of the water from the slurry 16, the selectively applying of the patterning fluid 20, and the removing (of at least some liquid of the patterning fluid 20) to form an intermediate part 56; activating the latent binder 22 in the intermediate part 56 to form a cured intermediate part 56'; extracting the cured intermediate part 56' from a build material volume to remove any non-patterned metallic or ceramic particles; and heating the cured intermediate part 56' to form a sintered part 62. In these examples, the processes shown in FIG. 3A through FIG. 3C may be repeated to iteratively build up several patterned layers and to form the patterned intermediate part 56. Following deposition of the patterning fluid 20 onto predetermined portion(s) 40 of the build material layer 38, the controller 28 may process data, and in response, control the build area platform 12 to be moved a relatively small distance in the down direction denoted by the bi-directional arrow 44 (shown in FIG. 1). In other words, the build area platform 12 may be lowered to enable the next layer of build material slurry 16 to be applied to form the next build material layer 38. For example, the build material platform 12 may be lowered a distance that is equivalent to the height of the layer 38. In addition, following the lowering of the build area platform 12, the controller 28 may control the build material supply 14 to supply additional build material slurry 16 (e.g., through operation of an elevator, an auger, or the like), the build material dispenser 17 to deposit, and the build material distributor 18 to spread another slurry layer 36 on top of the previously formed build material layer 38. Water 34 may be evaporated from the newly formed slurry layer 36 to form another build material layer 38, and the newly formed build material layer 38 may be patterned with patterning fluid 20. Liquid from the patterning fluid 20 may then be evaporated in preparation for the application of a subsequent slurry layer 36.

Repeatedly forming and patterning new layers (without activating and curing each layer) results in the formation of a build material cake 58, as shown in FIG. 3E, which includes the patterned intermediate part 56 residing within the non-patterned portions 42 of each of the build material layers 38. The patterned intermediate part 56 is a volume of the build material cake 58 that is filled with the metallic or ceramic particles 30 and latent binder 22 from the patterning fluid 20 within the inter-particle spaces. The remainder of the build material cake 58 is made up of the non-patterned metallic or ceramic particles 30 bound by the hydrocolloid glue 32'.

Also as shown in FIG. 3E, the build material cake 58 may be exposed to heat or electromagnetic radiation to generate heat, as denoted by the arrows 64. Heating the patterned intermediate part 56 may cause the latent binder particles 22 to coalesce into a continuous polymer phase or glue 22' among the metallic or ceramic particles 30 of the patterned intermediate part 56. The continuous polymer phase or glue 22' may act as a heat-activated adhesive between the metallic or ceramic particles 30 to form the stabilized, cured intermediate part 56'. Heating the patterned intermediate part 56 to reach the activation temperature to form the cured intermediate part 56' may also result in additional evaporation of the liquid vehicle from the patterned intermediate part 56. The evaporation may result in some densification, through capillary action, of the cured intermediate part 56'.

In the example shown in FIG. 3E, the build material cake 58 may remain on the build area platform 12 while being heated by the heat and/or radiation source 26'. In another example, the build area platform 12, with the build material cake 58 thereon, may be detached from the inkjet applicator 24 and placed in a separate heat source. Any of the previously described heat and/or radiation sources 26 and/or 26' may be used.

In any of the examples using heat for activation, it is to be understood that the activation/curing temperature may be at or above the minimum film formation temperature (MFFT) of the patterning fluid 20 and below the thermal decomposition temperature of the latent particles 22 (i.e., below a temperature threshold at which thermal decomposition occurs). For a majority of suitable latex polymer particles, the upper limit of the activation/curing temperature ranges from about 250° C. to about 270° C. Above this temperature threshold, the latex polymer particles would chemically degrade into volatile species and leave the patterned intermediate part 56, and thus would stop performing their function. In some instances, the activation temperature is also below the thermal decomposition temperature of the hydrocolloid 32. For some of the hydrocolloids 32, an upper limit on thermal exposure ranges from about 150° C. to about 220° C. Above this temperature, the hydrocolloid 32 may chemically degrade into water-insoluble species that could no longer be removed from the build material cake 58 by submersion in water, and thus would inhibit the recycling of non-patterned build material. As an example, the activation temperature may range from about 75° C. to about 200° C. As another example, the activation temperature may range from about 100° C. to about 150° C. As still another example, the activation temperature may range from about 140° C. to about 170° C.

The length of time for which the heat is applied to the patterned layer or the patterned intermediate part 56 may be dependent, for example, on one or more of: characteristics of the heat and/or radiation source 26, 26', characteristics of the latent binder 22, characteristics of the metallic or ceramic particles 30 (e.g., type, particle size, etc.), and/or the characteristics of the 3D object/part model (e.g., wall thickness). In an example, the patterned layer or the patterned intermediate part 56 may be heated at the activation temperature for an activation/curing time period ranging from about 1 second to about 30 seconds for layer-by-layer curing and from about 1 minute to about 360 minutes for post-print curing.

The rate at which the patterned intermediate part 56 is heated to the activation temperature may depend, in part, on one or more of: the patterning fluid 20 used, the size (i.e., thickness and/or area (across the x-y plane)) of the build material layer(s) 38, and/or the characteristics of the 3D object/part model (e.g., size, wall thickness, etc.). The patterned intermediate part 56 may be heated to the activation temperature at a rate of about 1° C./minute to about 10° C./minute, although it is contemplated that a slower or faster heating rate may be used.

Whether activation/curing occurs layer-by-layer or after the entire intermediate part 56 is patterned, the resulting cured intermediate part 56' has enough mechanical strength to be able to withstand extraction from the build material platform 12 without being deleteriously affected (e.g., the shape is not lost). In other words, the cured intermediate part 56' exhibits handleable mechanical durability. As such, the cured intermediate part 56' may then be extracted from the build material cake 58.

In some examples, the cured intermediate part 56' is extracted in an aqueous extraction process. An example of the wet extraction process is shown in FIG. 3F. As shown in FIG. 3F, the non-patterned portions 42 of the build material cake 58 (i.e., the metallic or ceramic particles 30 not bound by the activated, activated binder/continuous network/glue 22') may be removed from the cured intermediate part 56' by exposure to water. The metallic or ceramic particles 30 in the non-patterned portion(s) 42 of the build material cake 58 are loosely held together by hydrocolloid glue 32'. In contrast, the cured intermediate part 56' contains the activated binder (i.e., the continuous network or glue 22') that strongly binds the metallic or ceramic particles 30 together. This combination of materials in the build material cake 58 enables the wet extraction process to readily dissolve the hydrocolloid glue 32' and debind the non-patterned metallic or ceramic particles 30, while leaving the cured intermediate part 56' intact. The hydrocolloid glue 32' in the cured intermediate part 56' may not be affected by the water used in the aqueous extraction process, in part because it is intermingled with the substantially continuous network/continuous polymer phase/glue 22' (which is not water soluble). However, if some or all of the hydrocolloid glue 32' in the cured intermediate part 56' is dissolved, the volume removed is so small (hydrocolloid concentration is less than 0.5 vol % of slurry) that integrity of the cured intermediate part 56' is not deleteriously affected.

Water exposure may be accomplished by spraying the build material cake 58 with water using wet extraction tool(s) 66, such as a hose and a sprayer, a spray gun, etc. Water exposure may also be accomplished by sonicating the build material cake 58 in a water bath. Water exposure may also be accomplished by soaking the build material cake 58 in water. In some examples, the water may be heated (e.g., to a temperature ranging from about 22° C. to about 80° C.

Wet extraction of non-patterned metallic or ceramic particles 30 may be gentler, when compared to dry methods, such as sand blasting, on fine structural features (e.g., sharp angles, surface texture, etc.). Wet extraction results in fewer particles (e.g., metallic or ceramic particles 30) in the air. Wet extraction also results in the formation of a reclamation mixture of the metallic or ceramic particles 30, the hydrocolloid 32, and water, and this mixture can be recycled back into the build material slurry 16. When the reclamation mixture from the wet extraction process is to be recycled into the build material slurry 16, it may be desirable to measure the amount of water 34 used in the wet extraction process so that so that the recycled build material slurry 16 may include an appropriate amount of water 34.

In some examples, the cured intermediate part 56' may be cleaned after extraction to remove any remaining non-patterned metallic or ceramic particles 30 from its surface. In an example, the cured intermediate part 56' may be cleaned with a brush and/or an air jet.

Following wet extraction, the cured intermediate part 56' may contain water in between metal or ceramic build material particles. Retained water may be removed by heating in an oven at temperatures ranging from 40° C. to 100° C. Water removal can be accelerated by heating in a vacuum.

In some examples, dry extraction of non-patterned metallic or ceramic particles 30 from the build material cake 58 may be used in place of wet extraction. Vibratory or compressive forces may be applied to the build material cake 58 to facilitate breaking apart of the build material cake 58. Metallic or ceramic particles 30 from non-patterned regions (e.g., 42 in FIG. 3C) that remain bound to the cured intermediate part 56' may be removed by light bead blasting or cleaning with a brush and/or an air jet.

After the extraction and/or the cleaning of the cured intermediate part 56', the cured intermediate part 56' may be heated to form the sintered part 62. While not shown in FIG. 2, in an example of the method 100, the heating of the cured intermediate part 56' to form the sintered part 62 includes: heating the cured intermediate part 56' to a sintering temperature to form the sintered part 62. This example may be used when the activated binder becomes part of the final 3D part, and does not need to be removed. For example, when metal nanoparticles are used as the latent binder 22, debinding may not be a part of the method 100. In another example of the method 100, the heating of the cured intermediate part 56' to form the sintered part 62 includes: heating the cured intermediate part 56' to a thermal decomposition temperature of the activated binder (i.e., the continuous network or glue 22') to create an at least substantially binder-free part 60; and heating the at least substantially binder-free part 60 to a sintering temperature to form the sintered part 62.

When de-binding is utilized, heating to de-bind and heating to sinter take place at two different temperatures, where the temperature for de-binding is lower than the temperature for sintering. Both the de-binding and the sintering heating stages are generally depicted in FIG. 3G, where heat or radiation to generate heat may be applied as denoted by the arrows 64 from the heat source 26'.

Heating to de-bind is accomplished at a thermal decomposition temperature, i.e., a temperature that is sufficient to thermally decompose the activated binder 22'. As such, the temperature for de-binding depends upon the material of the latent binder 22 in the patterning fluid 20. In an example, the thermal decomposition temperature ranges from about 250° C. to about 600° C. In another example, the thermal decomposition temperature ranges from about 280° C. to about 600° C., or to about 500° C. The activated binder 22' may have a clean thermal decomposition mechanism (e.g., leaves <5 wt % solid residue of the initial latent binder 22, and in some instances <1 wt % solid residue of the initial latent binder 22). The smaller residue percentage (e.g., close to 0%) is more desirable.

The temperature used for de-binding may also thermally decompose the hydrocolloid glue 32'. For example, xanthan gum decomposes at about 180° C. The hydrocolloid glue 32' may have a relatively clean thermal decomposition mechanism (e.g., leaves <30 wt % solid residue of the hydrocolloid 32).

Heating to sinter is accomplished at a sintering temperature that is sufficient to sinter the remaining metallic or ceramic particles 30. The sintering temperature is highly depending upon the composition of the metallic or ceramic particles 30. During heating/sintering, the at least substantially binder-free part 60 or the cured intermediate part 56'

(including an activated binder 22' that is not removed) may be heated to a sintering temperature ranging from about 80% to about 99.9% of the melting point or melting temperature range in degrees Kelvin of the metallic or ceramic particles 30. In another example, the at least substantially binder-free part 60 or the cured intermediate part 56' (including an activated binder 22' that is not removed) may be heated to a sintering temperature ranging from about 90% to about 95% of the melting point or melting temperature range in degrees Kelvin of the metallic or ceramic particles 30. In still another example, the at least substantially binder-free part 60 or the cured intermediate part 56' (including an activated binder 22' that is not removed) may be heated to a sintering temperature ranging from about 60% to about 90% of the melting point or melting temperature range of the metallic or ceramic particles 30. In yet another example, the sintering temperature may range from about 10° C. below the melting temperature of the metallic or ceramic particles 30 to about 50° C. below the melting temperature of the metallic or ceramic particles 30. In yet another example, the sintering temperature may range from about 100° C. below the melting temperature of the metallic or ceramic particles 30 to about 200° C. below the melting temperature of the metallic or ceramic particles 30.

The sintering temperature may also depend upon the particle size and time for sintering (i.e., high temperature exposure time). As an example, the sintering temperature may range from about 450° C. to about 1800° C. In another example, the sintering temperature is at least 900° C. An example of a sintering temperature for bronze is about 850° C., an example sintering temperature for copper is 1000° C., and an example of a sintering temperature for stainless steel ranges from about 1000° C. to about 1450° C., and an example of a sintering temperature for aluminum alloys ranges from about 450° C. to about 600° C. While these temperatures are provided as sintering temperature examples, it is to be understood that the sintering heating temperature depends upon the metallic or ceramic particles 30 that are utilized, and may be higher or lower than the provided examples.

Heating at a suitable temperature sinters and fuses the metallic or ceramic particles 30 to form the sintered part 62, which may be even further densified relative to the at least substantially binder-free part 60. For example, as a result of sintering, the density may go from 50% density to over 90%, and in some cases very close to 100% of the theoretical density.

The length of time at which the heat (for each of de-binding and sintering) is applied and the rate at which the part 56', 60 is heated may be dependent, for example, on one or more of: characteristics of the heat source 26', characteristics of the activated binder 22', characteristics of the metallic or ceramic particles 30 (e.g., type, particle size, etc.), and/or the characteristics of the sintered part 62 (e.g., wall thickness).

The cured intermediate part 56' may be heated at the thermal decomposition temperature for a thermal decomposition time period ranging from about 10 minutes to about 12 hours. The cured intermediate part 56' may be heated to the thermal decomposition temperature at a rate ranging from about 0.5° C./minute to about 20° C./minute. The heating rate may depend, in part, on one or more of: the amount of the activated binder 22, 22' in the cured intermediate part 56', the porosity of the cured intermediate part 56', and/or the characteristics of the cured intermediate part 56'/sintered part 62 (e.g., size, wall thickness, etc.).

The at least substantially binder-free part 60 may be heated at the sintering temperature for a sintering time period ranging from about 20 minutes to about 15 hours. The at least substantially binder-free part 60 may be heated to the sintering temperature at a rate ranging from about 1° C./minute to about 20° C./minute. A high ramp rate up to the sintering temperature may be desirable to produce a more favorable grain structure or microstructure. However, in some instances, slower ramp rates may be desirable.

In some examples of the method 100, the heat for each of de-binding and sintering may be applied in an environment containing an inert gas, a low reactivity gas, a reducing gas, or a combination thereof. In other words, the heating of the cured intermediate part 56' to the thermal decomposition temperature and the heating of the at least substantially binder-free part 60 to the sintering temperature are accomplished in an environment containing an inert gas, a low reactivity gas, a reducing gas, or a combination thereof. The de-binding may be accomplished in an environment containing an inert gas, a low reactivity gas, and/or a reducing gas so that the binder continuous network 22' thermally decomposes rather than undergoing an alternate reaction which would fail to produce the at least substantially binder-free part 60 and/or to prevent the oxidation of the metallic particles 30. The sintering may be accomplished in an environment containing an inert gas, a low reactivity gas, and/or a reducing gas so that the metallic particles 30 will sinter rather than undergoing an alternate reaction (e.g., an oxidation reaction) which would fail to produce the sintered part 62. Examples of inert gas include argon gas, helium gas, etc. An example of a low reactivity gas includes nitrogen gas, and examples of reducing gases include hydrogen gas, carbon monoxide gas, etc.

In other examples of the method 100, 200, the heat (for each of de-binding and sintering) may be applied in an environment containing carbon in addition to an inert gas, a low reactivity gas, a reducing gas, or a combination thereof. The de-binding and the sintering may be accomplished in an environment containing carbon to reduce the partial pressure of oxygen in the environment and further prevent the oxidation of the metallic particles 30 during de-binding and sintering. An example of the carbon that may be placed in the heating environment includes graphite rods. In other examples, a graphite furnace may be used.

In still other examples of the method 100, 200, the heat (for each of de-binding and sintering) is applied in a low gas pressure or vacuum environment. The de-binding and the sintering may be accomplished in a low gas pressure or vacuum environment so that the activated binder continuous network 22' thermally decomposes and/or to prevent the oxidation of the metallic or ceramic particles 30. Moreover, sintering at the low gas pressure or under vacuum may allow for more complete or faster pore collapse, and thus higher density parts. However, vacuum may not be used during sintering when the metallic or ceramic particles 30 (e.g., Cr) are capable of evaporating in such conditions. In an example, the low pressure environment is at a pressure ranging from about 1E-5 torr ($1*10^{-5}$ torr) to about 10 torr.

In yet other examples of the method 100, the heat (for each of de-binding and sintering) may be applied in any environment, including an environment that contains oxygen. In these examples, the metallic or ceramic particles 30 may have a low reactivity with or may react with oxygen to produce a metal oxide coating on the particles that can be later transformed to zero valent metal by heating in a reducing ambient (e.g., hydrogen or a nitrogen-hydrogen mixture). Examples of metallic particles 30 that may have a low reactivity include silver (Ag), gold (Au), and platinum (Pt).

To further illustrate the present disclosure, examples are given herein. It is to be understood these examples are provided for illustrative purposes and are not to be construed as limiting the scope of the present disclosure.

EXAMPLES

Example 1

Several example build material slurries were prepared using Carpenter 17-4PH stainless steel particles with D90=16 μm (as the metallic particles), CP Kelko Kelzan xanthan gum (as the hydrocolloid), water, and varying amounts of 1-2 butanediol (as the humectant). Table 4 below provides the composition of each of the slurries, with the weight percentage and the volume percentage of each component in the slurry.

TABLE 4

| Slurry ID | Stainless Steel Particles Wt % (Vol %) | Xanthan Gum Wt % (Vol %) | Water Wt % (Vol %) | 1,2-Butanediol Wt % (Vol %) |
|---|---|---|---|---|
| Ex. 1 | 90 (~53) | 0.1 (~0.3) | 9.9 (~47) | 0 (0) |
| Ex. 2 | 90 (~53) | 0.1 (~0.3) | 9.4 (~45) | 0.5 (~2) |
| Ex. 3 | 90 (~53) | 0.1 (~0.3) | 8.9 (~44) | 1.0 (~3) |
| Ex. 4 | 90 (~53) | 0.1 (~0.3) | 7.9 (~41) | 2.0 (~6) |

Figure 4:
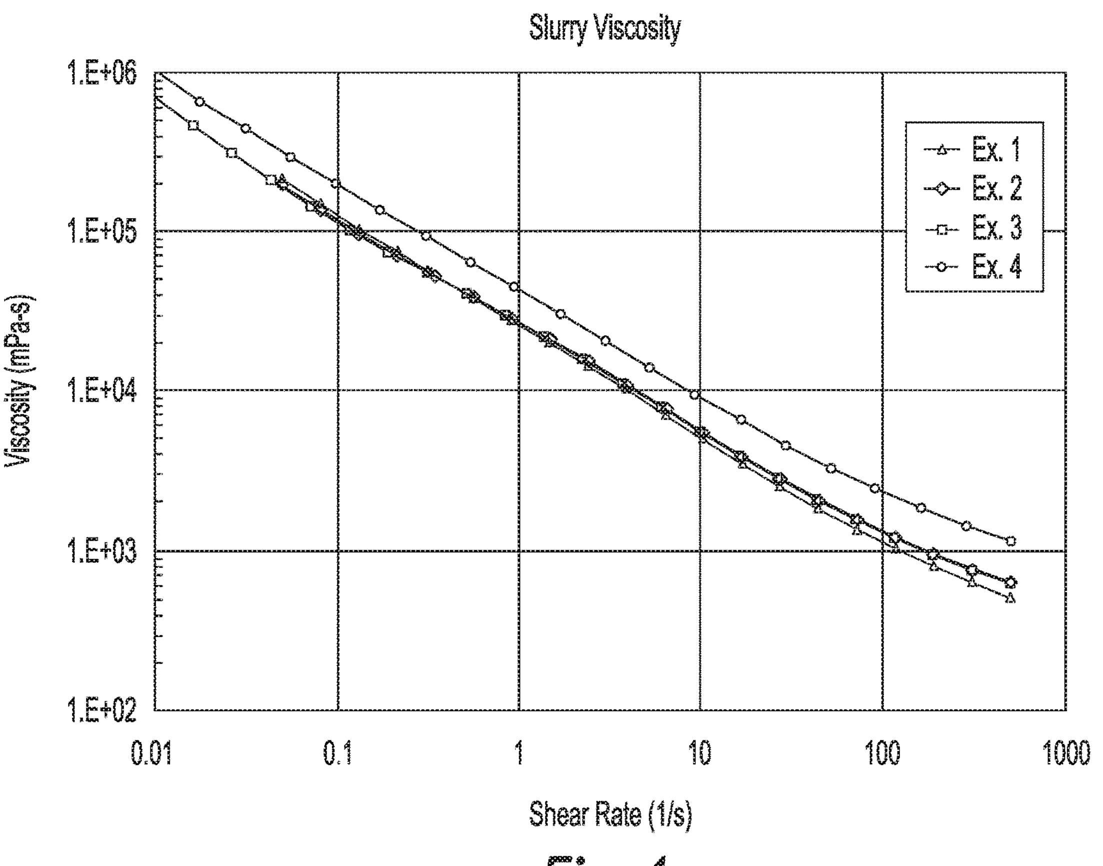
FIG. 4 is a graph depicting viscosity (mPa·$s^{-1}$, Y-axis) versus shear rate (1/s, X-axis) for several example build material slurries.

The viscosities of each of the example slurries were measured at different shear rates ranging from 0.01 $s^{-1}$ to 1,000 $s^{-1}$ (at 25° C.). The results are shown in FIG. 4. Viscosity at the extremes of the range are representative of a slurry at rest (~800 Pa·s) and when flowable (~1 Pa·s). As depicted, each of the example slurries exhibited a shear thinning effect. The high viscosities of the example slurries at low shear limit metal particle mobility, whereas the dramatic reduction in viscosity at high shear rate facilitates dispensing and spreading. The presence of the humectant did not deleteriously affect the rheological properties.

Figure 5:
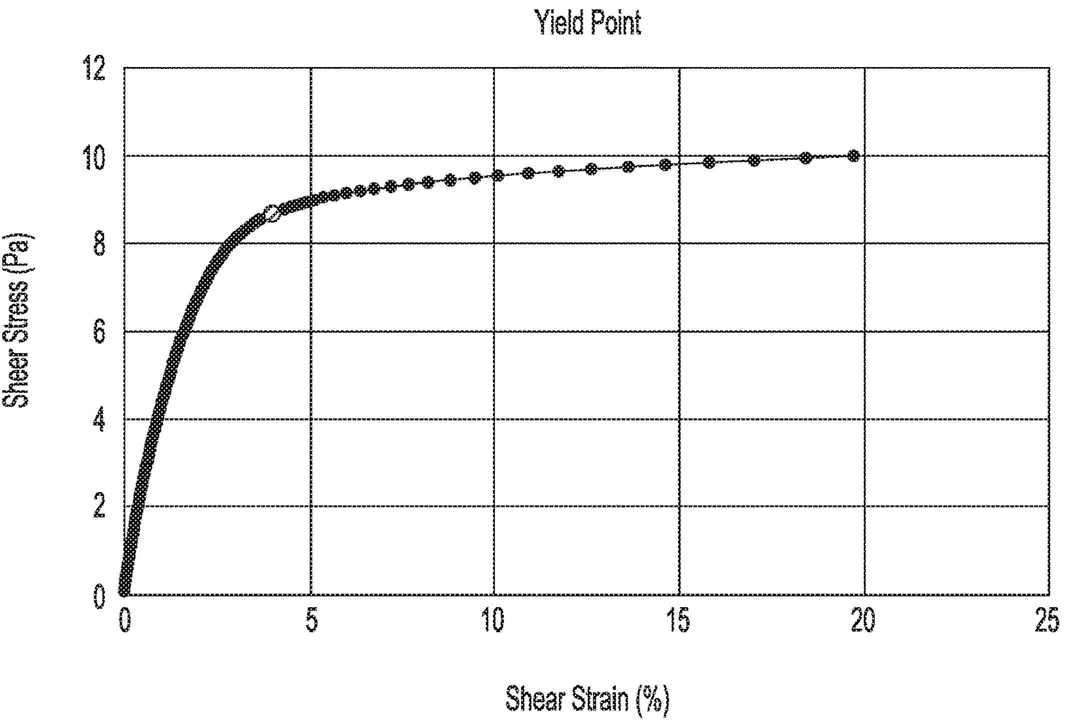
FIG. 5 is a graph depicting shear stress (Pa, Y-axis) versus shear strain (%, X-axis) for one example fluid material slurry.

Slurry stability can be inferred from a stress-strain curve. Ex. 1 slurry was exposed to a stress-strain test in an Anton Paar rheometer, the results of which are shown in FIG. 5. For this example slurry, a yield point of about 8 MPa was observed. This is several times larger than the average stress, or pressure, exerted on the hydrocolloid slurry vehicle by a 10 μm diameter steel particle. Particles in slurry Ex. 1 (D90=16 μm) impart a pressure on the slurry vehicle less than the yield point of about 8 MPa and thus are predicted to be stable against settling.

Figure 6:
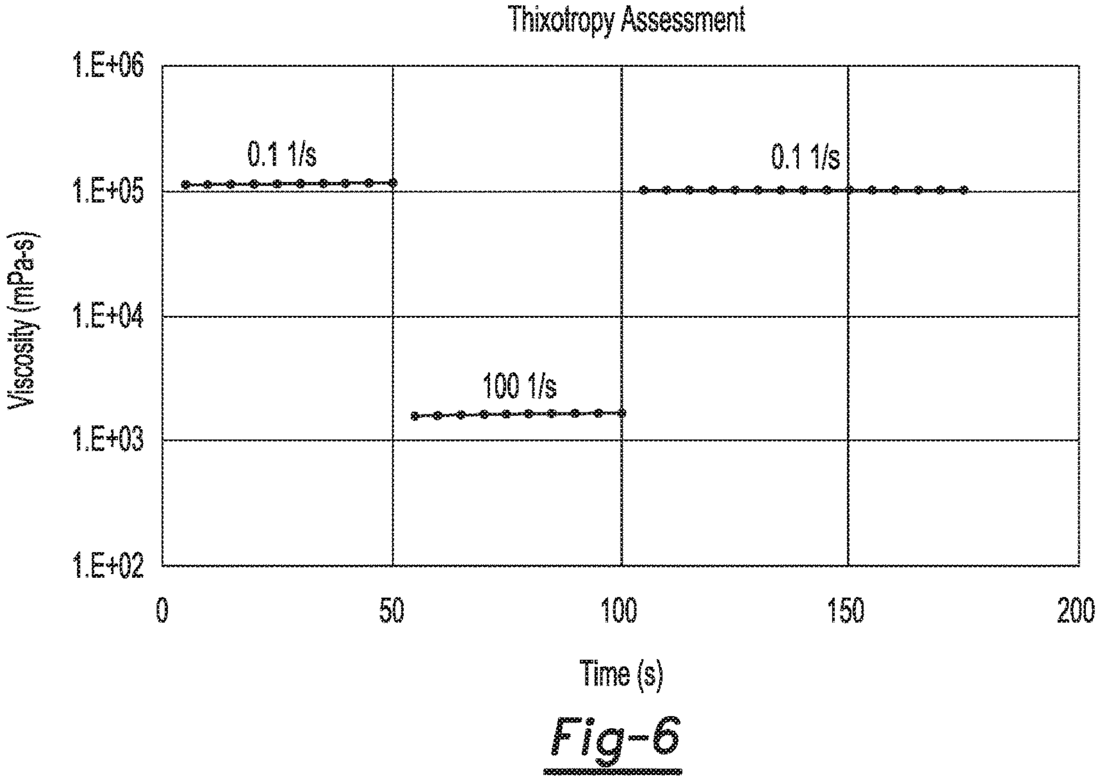
FIG. 6 is a graph depicting viscosity (mPa·$s^{-1}$, Y-axis) versus time (s, X-axis) as different shear rates are applied to an example build material slurry.

The Ex. 1 slurry was also tested for thixotropy. During this test, the shear rate to which the slurry is exposed is abruptly altered and the viscosity of the slurry is measured every 5 seconds throughout the measurement to determine how quickly the material responds to the change in shear rate. These results are shown in FIG. 6. As shown, the viscosity of Ex. 1 slurry rapidly (within 5 seconds) equilibrated to the steady state value appropriate for the given shear rate. Rapid recovery of shear viscosity after a shear rate impulse indicates that slurry leakage from a slot should be minimal after pumping has ceased.

Example 2

Ex. 5 slurry was prepared similarly to Ex. 1 slurry in example 1.

Three different comparative slurries were prepared without any hydrocolloid and with polyethylene glycol (MW=14,000 g/mol) as a viscosity modifier instead of the hydrocolloid. Table 5 below provides the composition of each of the comparative slurries, with the weight percentage and the volume percentage of each component in the slurry.

TABLE 5

| Slurry ID | Stainless Steel Particles Wt % (Vol %) | Polyethylene Glycol Wt % (Vol %) | Water Wt % (Vol %) |
|---|---|---|---|
| Comp. Ex. 6 | 90 (53) | 0 (0) | 10 (47) |
| Comp. Ex. 7 | 90 (53) | 0.3 (1.25) | 9.7 (45.8) |
| Comp. Ex. 8 | 90 (53) | 0.6 (2.5) | 9.4 (44.5) |

Figure 7A:
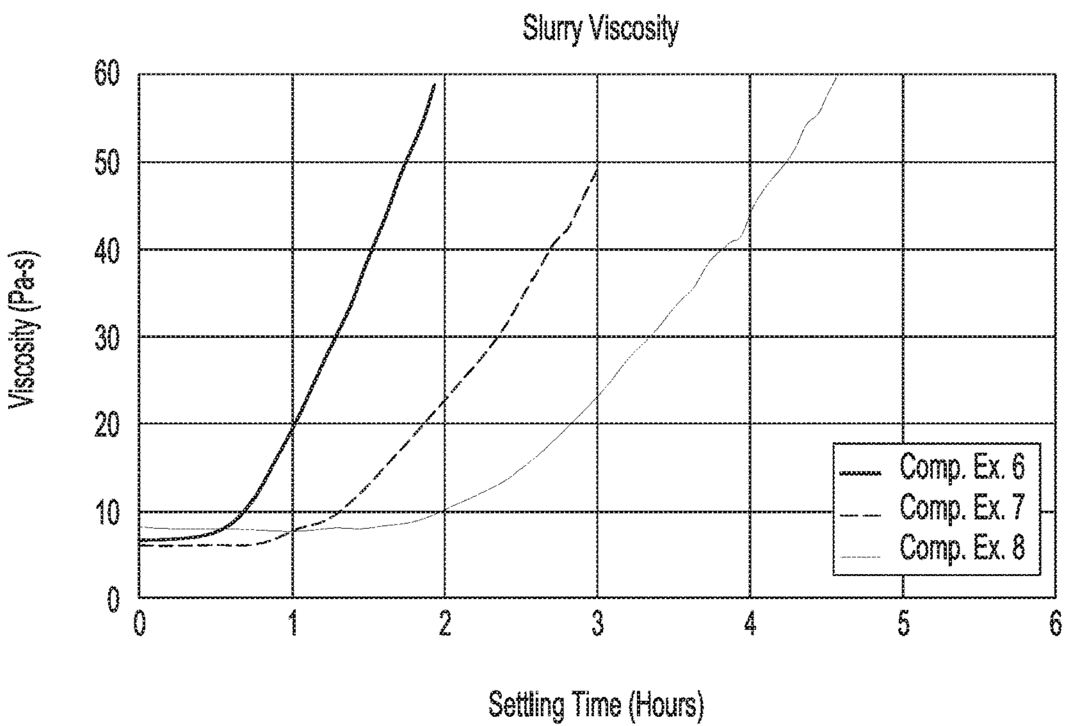
FIGS. 7A and 7B are graphs depicting viscosity (Pa·$s^{-1}$, Y-axis) versus settling time (hours, X-axis) for several comparative example build material slurries (FIG. 7A) and an example build material slurry (FIG. 7B)
Figure 7B:
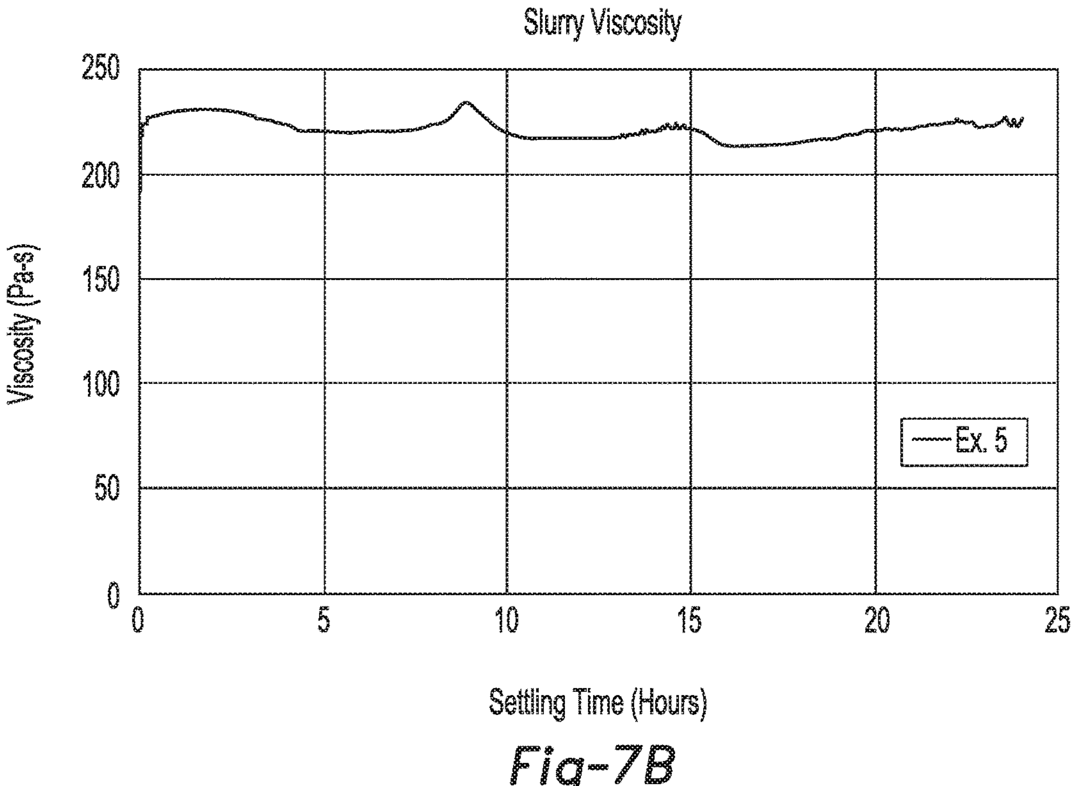

The stability of the comparative example slurries and the Ex. 5 slurry was compared by plotting viscosity as a function of time using a Brookfield rotating pendant viscometer. The shear rate applied was 0.28 $s^{-1}$ for the comparative example slurries, and was 0.028 $s^{-1}$ for Ex. 5 slurry. In the geometry of the rotating pendant viscometer, the settling of metal particles causes the viscosity to increase as slurry settles to the bottom of the measurement cylinder and becomes more densely packed. The results for the comparative examples are shown in FIG. 7A and the results for Ex. 5 slurry are shown in FIG. 7B. With only 1 wt % of the hydrocolloid additive (xanthan gum) in the slurry vehicle (0.35 vol % in slurry), the stability increased over 10-fold compared to a formulation containing 6 wt % of polyethylene glycol in the slurry vehicle (2.5 vol % in slurry) as a viscosity modifier. Additionally, the Ex. 5 slurry exhibited a constant viscosity, and thus stability, for at least 24 hours.

When fresh slurry is applied onto a powder bed of previously deposited dry slurry coatings, capillary forces draw the slurry vehicle into interstices between particles, and air displaced by liquid can be trapped to form bubbles before it can escape. The rate of capillary infusion is proportional to the viscosity of the liquid on the surface, and the high viscosity of example slurries at the low shear rate should limit capillary draw into underlying dry powder.

Figure 8A:
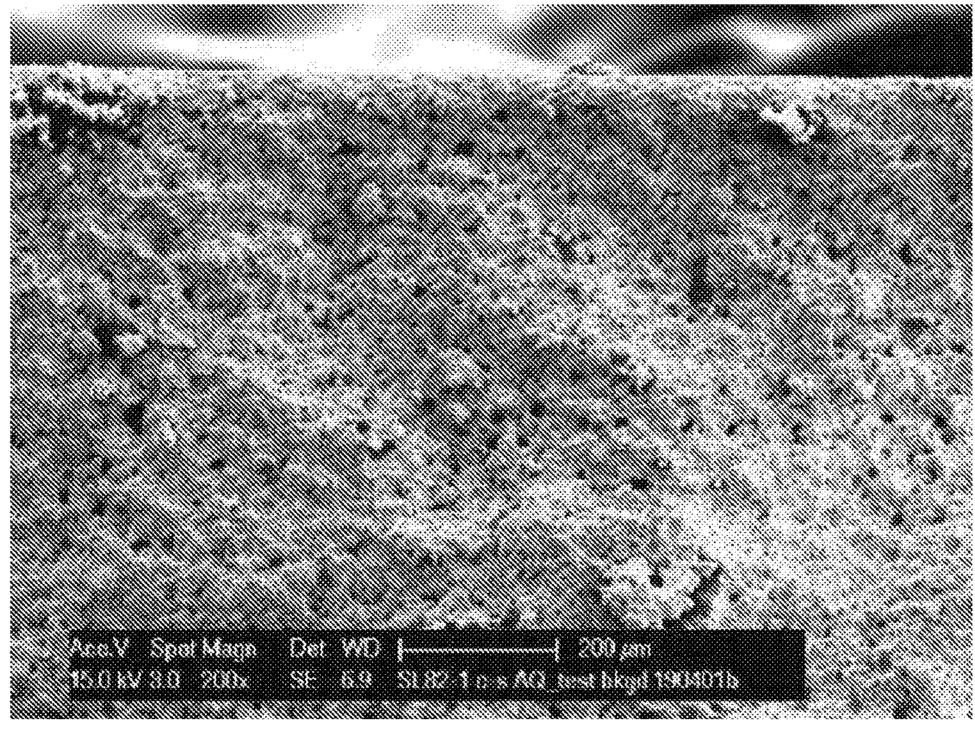
FIGS. 8A and 8B are scanning electron microscopy (SEM) images of several applied layers of a comparative example build material slurry (FIG. 8A) and of an example build material slurry (FIG. 8B).
Figure 8B:
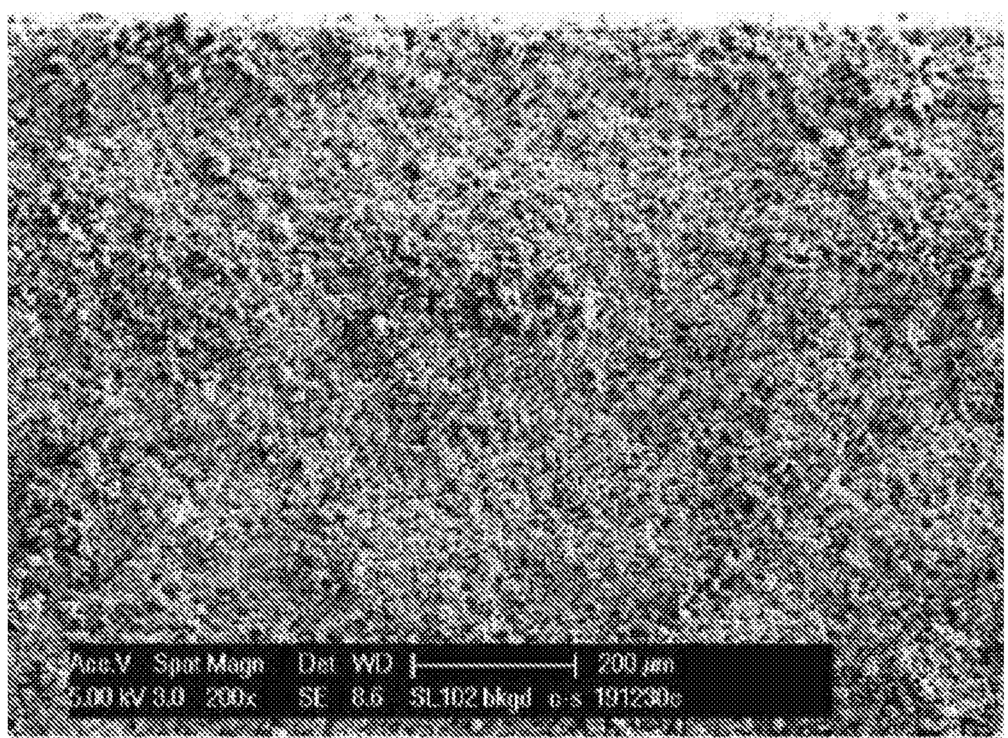

Several layers of Ex. 5 slurry and Comp. Ex. 7 slurry were deposited (using a slot die coater) in accordance with the method disclosed herein. Cross-section scanning electron microscopy (SEM) images of the upper half of the coating layers were taken and are shown in FIG. 8A (Comp. Ex. 7 slurry) and FIG. 8B (Ex. 5 slurry). The top of each of these images depicts the upper surfaces of the coating layers. The Comp. Ex. 7 slurry (with no hydrocolloid) had a uniform concentration of bubbles throughout the layers, and Ex. 5 slurry (with the hydrocolloid) a few scattered voids.

The packing density of the Ex. 5 slurry coatings was between 62% and 65%. This is significantly better than packing densities of less than 55% typically observed in dry powder spreading.

The Ex. 5 slurry was also used to form three different 3D objects within a single printing run.

For each object, layers (total thickness of about 2 mm) of the Ex. 5 slurry ware deposited and patterned. A slot coater was used to deposit each slurry layer with an individual layer thickness of about 75 μm. Latex patterning fluids were applied layer-by-layer using a thermal inkjet printer. Each object received a different loading of patterning fluid. Heating was applied to the build area platform to evaporate the water from the patterning fluid. This heating also dried the hydrocolloid to create open porosity for infiltration of subsequently applied patterning fluid. Drying the hydrocolloid also provided binding strength between the particles of about 1 MPa. This locked the stainless steel particles in place during jetting and prevented surface disruption that can otherwise occur when jetting binder into dry powder.

The entire build material cake, including the three green parts therein, was then exposed to heating on a hotplate at 160° C. for 1 hour to cure the latex binder in the three green parts. After curing, the build material cake and cured green parts therein were exposed to wet decaking by submerging them in water. The hydrocolloid in the non-patterned regions dissolved and the stainless steel particles were easily removed.

Following extraction of the green parts by wet decaking, the parts were dried by heating to 70° C. for 1 hour. The strength of the three green parts was tested, and ranged from 5 MPa to 8 MPa, which is suitable for being handled without breaking.

Overall, the results in Examples 1 and 2 indicate that the hydrocolloid does not interfere with the formation of strong green parts, and imparts a shear thinning property to the slurry which is desirable for stability when the slurry is not in use and flowability when it is desired.

It is to be understood that the ranges provided herein include the stated range and any value or sub-range within the stated range. For example, a range from about 0.05 percent by volume to less than 0.5 percent by volume should be interpreted to include not only the explicitly recited limits of from about 0.05 percent by volume to less than 0.5 percent by volume, but also to include individual values, such as 0.11 vol %, 0.15 vol %, 0.385 vol %, 0.4 vol %, etc., and sub-ranges, such as from about 0.07 vol % to about 0.35 vol %, from about 0.1 vol % to about 0.4 vol %, from about 0.25 vol % to about 0.5 vol %, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A shear thinning build material slurry, comprising:

metallic build material particles selected from the group consisting of steel particles, stainless steel particles, bronze particles, titanium particles and alloys thereof, nickel particles, cobalt particles, iron particles and alloys thereof, gold particles and alloys thereof, silver particles and alloys thereof, platinum particles and alloys thereof, and copper particles and alloys thereof, wherein the build material particles have a particle size ranging from about 5 μm to about 20 μm;

a hydrocolloid present in an amount ranging from about 0.05 percent by volume to less than 0.5 percent by volume of the shear thinning build material slurry, the hydrocolloid having a molecular weight ranging from about $0.5\times10^6$ g/mol to about $50\times10^6$ g/mol and is selected from the group consisting of xanthan gum, scleroglucan, diutan gum, rhamsan gum, guar gum, locust bean gum, tara gum, cassia gum, gum tragacanth, welan gum, carrageenan, flaxseed gum, tamarind gum, konjac maanan, agarose, gellan gum, and combinations thereof; and water, wherein the build material slurry is a ready-to-use three-dimensional (3D) printing build material.

2. The shear thinning build material slurry as defined in claim 1 wherein a ratio of a viscosity of the shear thinning build material measured at a shear rate of 0.1 $s^{-1}$ to a viscosity of the shear thinning build material measured at a shear rate of 100 $s^{-1}$ is greater than 30.

3. The shear thinning build material slurry as defined in claim 1 wherein the hydrocolloid has a decomposition temperature of greater than 100° C.

4. The shear thinning build material slurry as defined in claim 1 wherein the metallic or ceramic particles are present in an amount ranging from about 35 percent by volume to about 70 percent by volume of the shear thinning build material slurry.

5. The shear thinning build material slurry as defined in claim 1, further comprising a humectant, an evaporation enhancer, a surfactant, an antimicrobial agent, or combinations thereof.

6. The shear thinning build material slurry as defined in claim 1 wherein the metallic build material particles are selected from the group consisting of steel particles, stainless steel particles, bronze particles, titanium particles and alloys thereof, nickel particles, cobalt particles, iron particles, gold particles and alloys thereof, silver particles, platinum particles and alloys thereof, and copper particles.

7. The shear thinning build material slurry as defined in claim 1, further comprising from 2 percent by volume to 6 percent by volume of a humectant, based on a total weight of the shear thinning build material slurry.

8. The shear thinning build material slurry as defined in claim 7 wherein the humectant is selected from the group consisting of 1,2-butanediol, 2-pyrrolidone, 2,3-pentanediol, ethylene glycol, propylene glycol, and combinations thereof.

9. The shear thinning build material slurry as defined in claim 1 wherein the shear thinning build material slurry consists of the metallic particles, the hydrocolloid, the water, and a humectant, and wherein the humectant is 1,2-butanediol.

10. A three-dimensional printing kit, comprising:

a shear thinning build material slurry, including:

metallic particles having a particle size ranging from about 5 μm to about 20 μm, wherein the metallic particles are selected from the group consisting of steel particles, stainless steel particles, bronze particles, titanium particles and alloys thereof, nickel particles, cobalt particles, iron particles and alloys thereof, gold particles and alloys thereof, silver particles and alloys thereof, platinum particles and alloys thereof, and copper particles and alloys thereof;

a hydrocolloid present in an amount ranging from about 0.05 percent by volume to less than 0.5 percent by volume of the shear thinning build material slurry, the hydrocolloid having a molecular weight ranging from about $0.5\times10^6$ g/mol to about $50\times10^6$ g/mol and selected from the group consisting of xanthan gum, scleroglucan, diutan gum, rhamsan gum, guar gum, locust bean gum, tara gum, cassia gum, gum tragacanth, welan gum, carrageenan, flaxseed gum, tamarind gum, konjac maanan, agarose, gellan gum, and combinations thereof; and water; and a patterning fluid including a latent binder in a liquid vehicle.

11. A method for three-dimensional (3D) printing, the method comprising:

exposing the shear thinning build material slurry of claim 1 to a shear rate greater than about 100 $s^{-1}$, thereby reducing a viscosity of the build material slurry to less than 10 $Pa \cdot s^{-1}$;

while the viscosity is reduced, applying the build material slurry to form a slurry layer;

evaporating at least some of the water from the slurry layer to form a build material layer; and selectively applying a patterning fluid on at least a portion of the build material layer, the patterning fluid including a latent binder.

12. The method as defined in claim 11 wherein the slurry layer is applied across a width of a substantially horizontal build platform.

13. The method as defined in claim 11, further comprising:

removing at least some liquid of the patterning fluid from the at least the portion of the build material layer;

activating the latent binder in the at least the portion of the build material layer;

repeating the exposing, the applying, the evaporating, the selectively applying, the removing, and the activating to form a cured intermediate part;

extracting the cured intermediate part from a build material volume to remove any non-patterned metallic or ceramic particles; and heating the cured intermediate part to form a sintered part.

14. The method as defined in claim 13 wherein:

the hydrocolloid has a decomposition temperature greater than 100° C.; and a solid thermal decomposition product of the hydrocolloid in the sintered part is less than 30% of an initial weight of the hydrocolloid in the build material slurry.

15. The method as defined in claim 11, further comprising:

removing at least some liquid of the patterning fluid from the at least the portion of the build material layer;

then repeating the exposing, the applying, the evaporating, the selectively applying, and the removing, to form an intermediate part;

activating the latent binder in the intermediate part to form a cured intermediate part;

extracting the cured intermediate part from a build material volume to remove any non-patterned metallic or ceramic particles; and heating the cured intermediate part to form a sintered part.

16. The method as defined in claim 15 wherein:

the hydrocolloid has a decomposition temperature greater than 100° C.; and a solid thermal decomposition product of the hydrocolloid in the sintered part is less than 30% of an initial weight of the hydrocolloid in the build material slurry.

17. The method as defined in claim 11 wherein the applying of the build material slurry is accomplished using a slot die coater, a doctor blade coater, a rod coater, a knife coater, or combinations thereof.

18. The shear thinning build material slurry as defined in claim 1 wherein the metallic build material particles are stainless steel particles.

19. A shear thinning build material slurry, comprising:

metallic build material particles having an average particle size ranging from about 5 µm to about 20 µm;

from about 0.3 percent by volume to less than 0.5 percent by volume of a hydrocolloid selected from the group consisting of xanthan gum, scleroglucan, diutan gum, rhamsan gum, guar gum, locust bean gum, tara gum, cassia gum, gum tragacanth, welan gum, carrageenan, flaxseed gum, tamarind gum, konjac maanan, agarose, gellan gum, and combinations thereof;

from about 2 percent by volume to about 6 percent by volume of a humectant; and water.

* * * * *